(12) United States Patent
Lin et al.

(10) Patent No.: US 10,735,727 B2
(45) Date of Patent: Aug. 4, 2020

(54) METHOD OF ADAPTIVE FILTERING FOR MULTIPLE REFERENCE LINE OF INTRA PREDICTION IN VIDEO CODING, VIDEO ENCODING APPARATUS AND VIDEO DECODING APPARATUS THEREWITH

(71) Applicant: Industrial Technology Research Institute, Hsinchu (TW)

(72) Inventors: Ching-Chieh Lin, Hsinchu (TW); Chun-Lung Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/455,765

(22) Filed: Jun. 28, 2019

(65) Prior Publication Data

US 2020/0007862 A1  Jan. 2, 2020

Related U.S. Application Data

(60) Provisional application No. 62/727,595, filed on Sep. 6, 2018, provisional application No. 62/691,729, filed on Jun. 29, 2018.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
CPC .... H04N 19/117; H04N 19/593; H04N 19/70; H04N 19/176; H04N 19/159; H04N 19/132; H04N 19/105; H04N 19/11
See application file for complete search history.

(56) References Cited

U.S. PATENT DOCUMENTS 9,681,132 B2  6/2017  Chen et al.
2018/0091764 A1  3/2018  Aharon et al.
(Continued)

FOREIGN PATENT DOCUMENTS

CN  106170093  11/2016
CN  108353171  7/2018
(Continued)

OTHER PUBLICATIONS

Yao-Jen Chang et al., "Improved Intra Prediction Method Based on Arbitrary Reference Tier Coding Schemes" , 2016 IEEE Picture Coding Symposium (PCS) , Dec. 2016, pp. 1-5.
(Continued)

*Primary Examiner* — Nam D Pham
(74) *Attorney, Agent, or Firm* — JCIPRNET

(57) ABSTRACT

A method of adaptive filtering for multiple reference line of intra prediction in video coding, a video encoding apparatus and video decoding apparatus therewith are provided in the disclosure. In the method of intra prediction in video coding, a method of adaptive filtering is used to dynamically determine operation of filtering is applied to input samples in the intra prediction or not, which can reduce the complexity of the intra prediction in video coding if multiple reference lines are used for the operation of the intra prediction, and also increase the efficiency of compressing performance of ultra-high resolution video.

18 Claims, 23 Drawing Sheets

(51) Int. Cl.
*H04N 19/132* (2014.01)
*H04N 19/159* (2014.01)
*H04N 19/176* (2014.01)
*H04N 19/70* (2014.01)
*H04N 19/593* (2014.01)

(52) U.S. Cl.
CPC ......... *H04N 19/159* (2014.11); *H04N 19/176* (2014.11); *H04N 19/593* (2014.11); *H04N 19/70* (2014.11)

(56) References Cited

U.S. PATENT DOCUMENTS

| | | | |
|---|---|---|---|
| 2018/0324417 A1 | 11/2018 | Karczewicz et al. | |
| 2019/0268594 A1* | 8/2019 | Lim | H04N 19/117 |

FOREIGN PATENT DOCUMENTS

| | | |
|---|---|---|
| TW | 201843999 | 12/2018 |
| WO | 2017190288 | 11/2017 |

OTHER PUBLICATIONS

Jiahao Li et al., "Efficient Multiple-Line-Based Intra Prediction for HEVC", IEEE Transactions on Circuits and Systems for Video Technology, vol. 28, Issue 4, Apr. 2018, pp. 947-957.

Benjamin Bross et al., "Versatile Video Coding (Draft 5)", 14th Meeting: Geneva, Document: JVET-N1001-v3, Mar. 2019, pp. 1-361.

Jani Lainema et al., "Intra Coding of the HEVC Standard", IEEE Transactions on Circuits and Systems for Video Technology, vol. 22, Issue 12, Dec. 2012, pp. 1792-1801.

Liquan Shen et al., "Fast CU size decision and mode decision algorithm for HEVC intra coding", IEEE Transactions on Consumer Electronics, vol. 59, Issue 1, Feb. 2013, pp. 207-213.

Gary J. Sullivan et al., "Overview of the High Efficiency Video Coding (HEVC) Standard", IEEE Transactions on Circuits and Systems for Video Technology, vol. 22, Issue 12, Dec. 2012, pp. 1649-1668.

Guang Chen et al., "Fast HEVC intra mode decision using matching edge detector and kernel density estimation alike histogram generation", 2013 IEEE International Symposium on Circuits and Systems (ISCAS2013), May 2013, pp. 53-56.

Thomas Wiegand et al., "Overview of the H.264/AVC video coding standard", IEEE Transactions on Circuits and Systems for Video Technology, vol. 13, No. 7, Jul. 2003, pp. 560-576.

Li-Li Wang et al., "Novel Adaptive Algorithm for Intra Prediction With Compromised Modes Skipping and Signaling Processes in HEVC", IEEE Transactions on Circuits and Systems for Video Technology, vol. 23, No. 10, Oct. 2013, pp. 1686-1694.

M. Albrecht et al., "Description of SDR, HDR and 360° video coding technology proposal by Fraunhofer HHI," JVET of ITU-T SG 16 WP 3 and ISO/IEC JTC 1/SC 29/WG 11 10th Meeting, Apr. 10-20, 2018, pp. 1-122.

"Search Report of Europe Counterpart Application," dated Oct. 23, 2019, pp. 1-9.

* cited by examiner

FIG. 3A

| 100 | 200 | 300 | 400 |
|-----|-----|-----|-----|
| 90  | 100 | 200 | 300 |
| 80  | 90  | 100 | 200 |
| 70  | 80  | 90  | 100 |

| 100 | 200 | 300 | 400 |
|-----|-----|-----|-----|
| 90  | 100 | 200 | 300 | ← 410
| 80  | 90  | 100 | 200 |
| 70  | 80  | 90  | 100 |

| | | | | | | | | | | | | |
|---|---|---|---|---|---|---|---|---|---|---|---|---|
| | | | | | | | | | | | ← 440 | ← 430 |
| | | | | | | | R(7,-2) | R(6,-2) | R(5,-2) | R(4,-2) | R(3,-2) | |
| | | | | | | | R(7,-1) | R(6,-1) | R(5,-1) | R(4,-1) | R(3,-1) | |
| | | | | | ← 420 | | | | | | | |
| 100 | 200 | 300 | 380 | | | | | | | | R(2,-2) | |
| 90 | 10 | 200 | 550 | 380 | | | | | | | R(2,-1) | |
| 80 | 90 | 10 | 200 | 550 | 380 | | | | | | | |
| 70 | 80 | 90 | 10 | 200 | 550 | | | | | | | |
| R(-2,2) | 70 | 80 | 90 | 10 | 200 | | | | | | | |
| R(-2,3) | R(-1,3) | 70 | 80 | 90 | 10 | | | | | | | |
| R(-2,4) | R(-1,4) | | | | | | | | | | | |
| R(-2,5) | R(-1,5) | | | | | | | | | | | |
| R(-2,6) | R(-1,6) | | | | | | | | | | | |
| R(-2,7) | R(-1,7) | | | | | | | | | | | |

FIG. 4C

METHOD OF ADAPTIVE FILTERING FOR MULTIPLE REFERENCE LINE OF INTRA PREDICTION IN VIDEO CODING, VIDEO ENCODING APPARATUS AND VIDEO DECODING APPARATUS THEREWITH

CROSS-REFERENCE TO RELATED APPLICATION

This application claims the priority benefits of U.S. provisional application Ser. No. 62/691,729, filed on Jun. 29, 2018, and U.S. provisional application Ser. No. 62/727,595, filed on Sep. 6, 2018. The entirety of each of the above-mentioned patent applications is hereby incorporated by reference herein and made a part of this specification.

TECHNICAL FIELD

The disclosure relates to a method of adaptive filtering for Multiple Reference Line (MRL) of intra prediction in video coding, and a video encoding apparatus and a video decoding apparatus therewith.

BACKGROUND

Applications that need a large number of video data are increasingly wide, such as a digital television, a digital live broadcast system, a wireless broadcast system, a personal digital assistant (PDA), a laptop or desktop computer, a tablet, an e-book reader, a digital camera, a digital recording device, a digital media player, a video game device, a video game control console, a cellular or satellite radio telephone (the so-called "smart phone"), a video teleconferencing device, a video streaming device and other similar devices. When the data needs to be transmitted via a stream or transferred in a communication network with limited bandwidth capacity, the difficulty may be possibly increased. Therefore, video data is usually compressed before the video data is transmitted in a modern telecommunication network. When the video data is stored on a storage device, the size of a video may also be a problem because memory resources may be limited. Before the transmission or storage of the video data, video compression devices often use software and/or hardware to encode the video data at the source, thereby reducing the data volume required to represent digital video images. Then, compressed data is then received and decompressed at an object apparatus by a video decompression circuit that decodes the video data. With the limited network resources and the increasing demand for higher video quality, there is a need for improving compression and decompression techniques that increase the compression ratio and almost have no reduction to the image quality.

SUMMARY

The disclosure provides a method of adaptive filtering for intra prediction, including: receiving an index, and performing filter selection according to the index to generate a filter index corresponding to the index; and selecting a filter corresponding to the filter index, filtering an input sample by using the filter to generate a filtered sample and outputting the filtered sample, or directly outputting the input sample as the filtered sample.

In one of a plurality of embodiments of the foregoing method of adaptive filtering for intra prediction, when the index indicates that the intra prediction operation is performed by using image samples of a multiple reference line (MRL), the filter index indicates that the input sample is directly output as the filtered sample.

The disclosure provides a method of intra prediction with adaptive filtering, including: performing reference smoothing filtering (RSF) operation on an input sample according to an index, wherein when the index indicates that image samples of a neighboring reference tier is used, after the RSF operation is performed on the input sample, the input sample is output as a filtered sample, and when the index indicates that image samples of a multiple reference line (MRL) is used, the input sample is directly output as the filtered sample; and performing intra prediction on the filtered sample.

The disclosure provides a video encoding apparatus, including a memory and a processor. The memory is configured to store a plurality of instructions and data. The processor accesses these instructions and data, and is configured to execute the instructions. The processor receives an index, and performs filter selection according to the index to generate a filter index corresponding to the index. The processor selects a filter corresponding to the filter index, filters an input sample by using the filter to generate a filtered sample and outputs the filtered sample, or directly outputs the input sample as the filtered sample.

In one of a plurality of embodiments of the foregoing video encoding apparatus, when the index indicates that the intra prediction operation is performed by using image samples of a multiple reference line (MRL), the filter index indicates that the input sample is directly output as the filtered sample.

The disclosure provides a video encoding apparatus, including an adder, configured to receive input image data and a predictor, and generate a residue after calculation; a transformation and quantification unit, configured to transform the residue and then perform quantification to obtain data; an entropy encoding unit, configured to process the data into compressed image data and output the compressed image data; an inverse quantification and inverse transformation unit, configured to restore the data to video decoded image data; and a prediction unit, configured to receive the input image data and the video decoded image data and generate the predictor accordingly. The prediction unit includes an intra prediction unit. The intra prediction unit is configured to receive an index, perform filter selection according to the index to generate a filter index corresponding to the index, and select a filter corresponding to the filter index for filtering operation, or directly output an input sample as a filtered sample.

The disclosure provides a video decoding apparatus, including a memory, configured to temporarily store compressed image data; an entropy decoding unit, configured to perform entropy decoding on the compressed image data according to an entropy encoding syntax element to obtain a bit stream; a prediction processing unit, coupled to the entropy decoding unit; an inverse quantification unit, coupled to the entropy decoding unit; an inverse transformation processing unit, coupled to the inverse quantification unit; a reconstruction unit, coupled to the inverse transformation processing unit and the prediction processing unit; and a filter unit, coupled to the reconstruction unit and the prediction processing unit. The prediction processing unit, the inverse quantification unit, the inverse transformation processing unit, the reconstruction unit and the filter unit generate decoded video data based on a syntax element extracted from the bit stream. The prediction processing unit is configured to obtain an index, and determine whether reference smoothing filtering (RSF) operation and/or boundary filtering operation are/is performed on the decoded video data via the index.

In order to make the aforementioned and other objectives and advantages of the disclosure comprehensible, embodiments accompanied with figures are described in detail below.

BRIEF DESCRIPTION OF THE DRAWINGS

FIGS. 3A to 3C illustrate an implementation example for prediction with reference to neighboring reconstructed image samples during intra prediction;

FIGS. 4A to 4C are an implementation example illustrating that if samples of a fixed neighboring reference tier (RT) are used as a prediction reference, a sample error is caused in a certain particular direction;

DETAILED DESCRIPTION OF DISCLOSED EMBODIMENTS

With the recent development of new technologies for applications such as networks, communication systems, displayers and computers, many applications require an efficient video encoding solution, such as high video compression rate, virtual reality (VR) and 360-degree video contents. In order to provide an immersive visual effect, improving video resolution to see more details in video was a conventional method. The VR technology is usually implemented by a head mounted device (HMD), and a distance between the HMD and eyes is very short, so the resolution of the video content needs to be increased to 8K and even 32K from the current 4K. In addition, the image refresh rate will also affect the VR use experience, so it is desirable to increase the image refresh rate to 30 pieces per second, 90 pieces per second or even 120 pieces per second. Based on the above requirements, the currently used high efficiency video coding (HEVC) (also known as H.265) does not seem to be sufficient to provide a better visual effect and experience to a user.

In order to further improve the coding efficiency and image quality for a digital video, a joint video exploration team (JVET) has applied several kinds of enhanced video coding technologies that meet potential needs to versatile video coding (VVC), so as to develop a future video coding (FVC) technology. An intra prediction technology adopted by JEM is extended from the original 35 prediction modes of the HEVC to 67 intra prediction modes (IPMs) for more accurate angle prediction. The JEM further introduces a new technology, including a method for improving the smoothness of a reference sample by a reference samples adaptive filter (RSAF), or a prediction method for adding options by position dependent intra prediction combination (PDPC), or a method for residue transformation by non-separable secondary transform (NSST), and the like.

Figure 1:
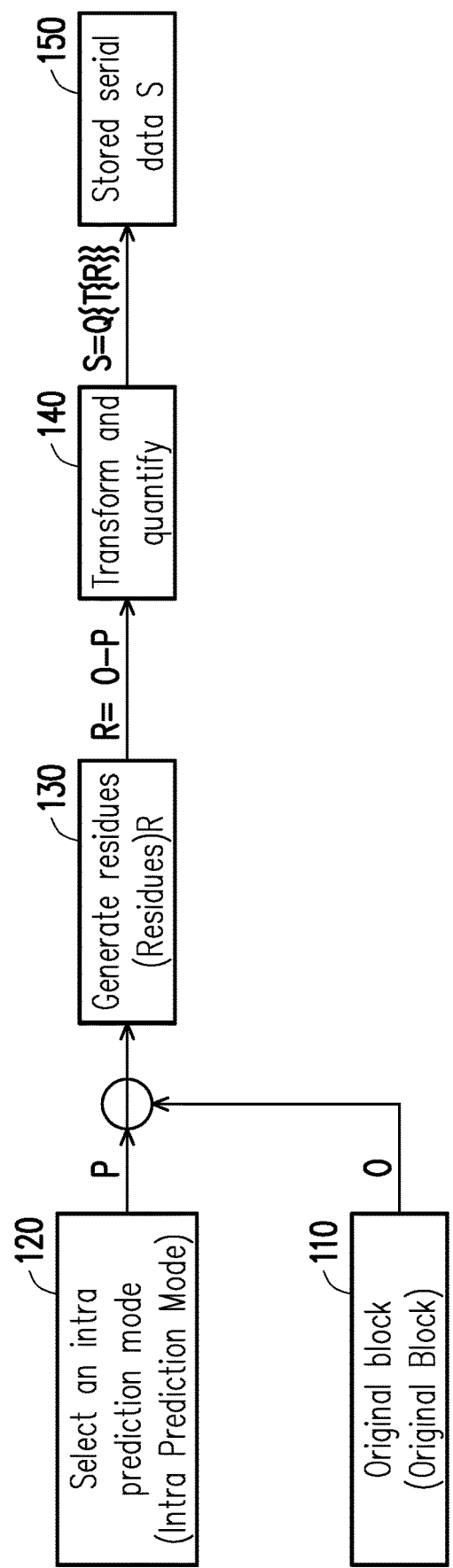
FIG. 1 is a conceptual graph of an implementation example configured to briefly describe intra prediction.

FIG. 1 is a conceptual graph of an implementation example configured to briefly describe intra prediction. The intra prediction method is a prediction technology for referring to spatially neighboring reconstructed image samples of a block unit as image blocks for prediction. The 35 IPMs adopted in the HEVC or the 67 IPMs adopted by the JEM include a planar mode of Mode 0 and a direct current (DC) mode of Mode 1, and both of the modes use samples of a fixed neighboring reference tier (RT) as a reference for prediction. Firstly, in Step 110, an original block "O" is obtained. In Step 120, an intra prediction mode is selected, and a current coding unit (CU) is predicted in a selected direction according to the selected intra prediction mode, and a predictor P is obtained. In Step 130, the predictor P is subtracted from the original block O by an adder to obtain a residue R (R=O−P). Then, the residue R is transformed and quantified, and quantified serial data S (S=Q{T{R}}) is obtained as in Step 140, and the serial data S is stored.

Figure 2:
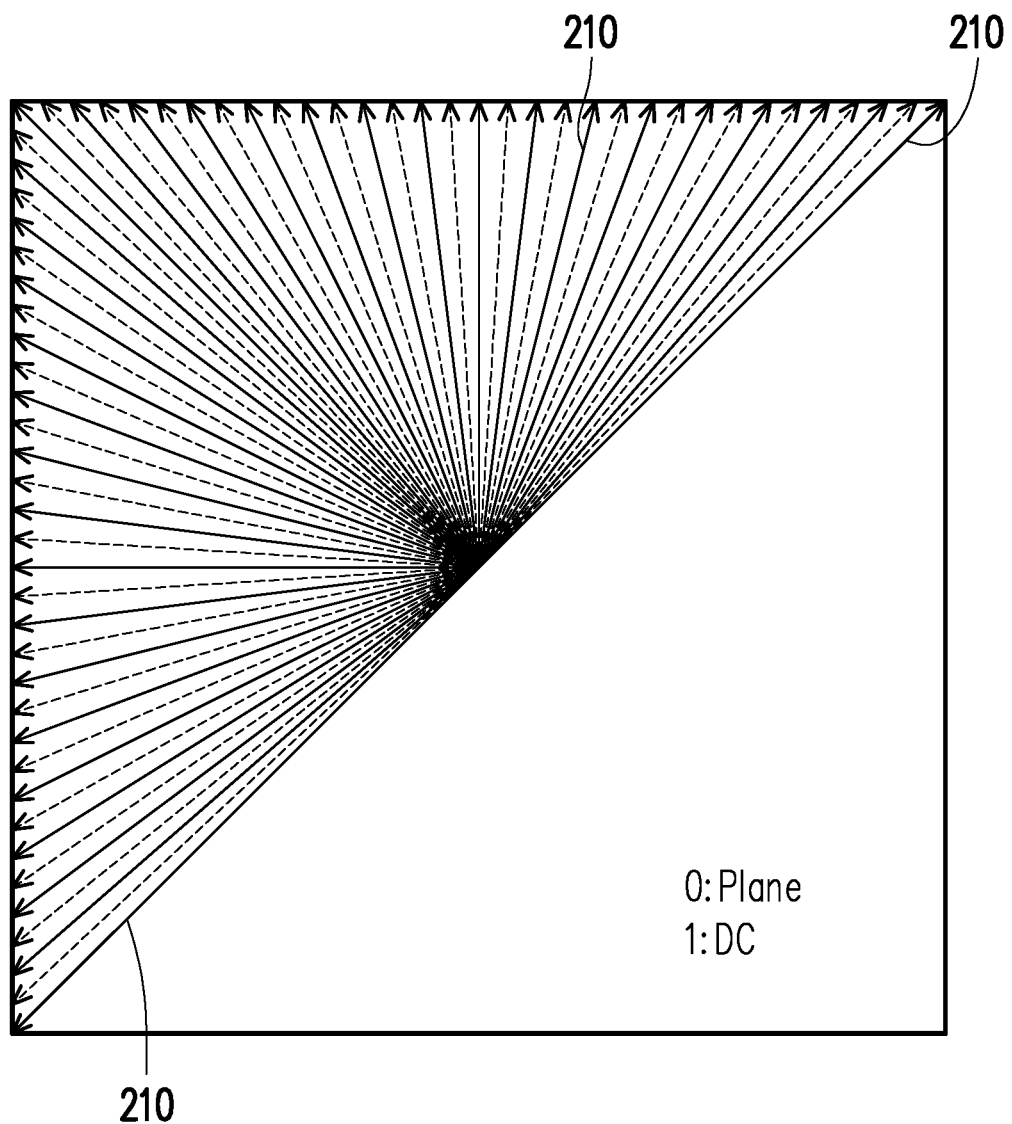
FIG. 2 illustrates different prediction modes of a video encoding apparatus for performing intra prediction along a plurality of prediction directions.

FIG. 2 illustrates different prediction modes of a video encoding apparatus for performing intra prediction along a plurality of prediction directions. The intra prediction method is a prediction technology for referring to spatially neighboring reconstructed image samples of a block unit as image blocks for prediction. Firstly, the video encoding apparatus may select to perform prediction along a plurality of prediction directions 210 (as indicated by the arrows). As mentioned above, either the 35 IPMs adopted in the HEVC or the 67 IPMs included in the intra prediction technology adopted by the JEM includes a planar mode of Mode 0 and a direct current (DC) mode of Mode 1, and both of the modes use samples of a fixed neighboring reference tier (RT) as a reference for prediction. During application, the above prediction mode may apply the planar mode and the DC mode for modeling smoothing changes and constant image regions.

Figure 3A:
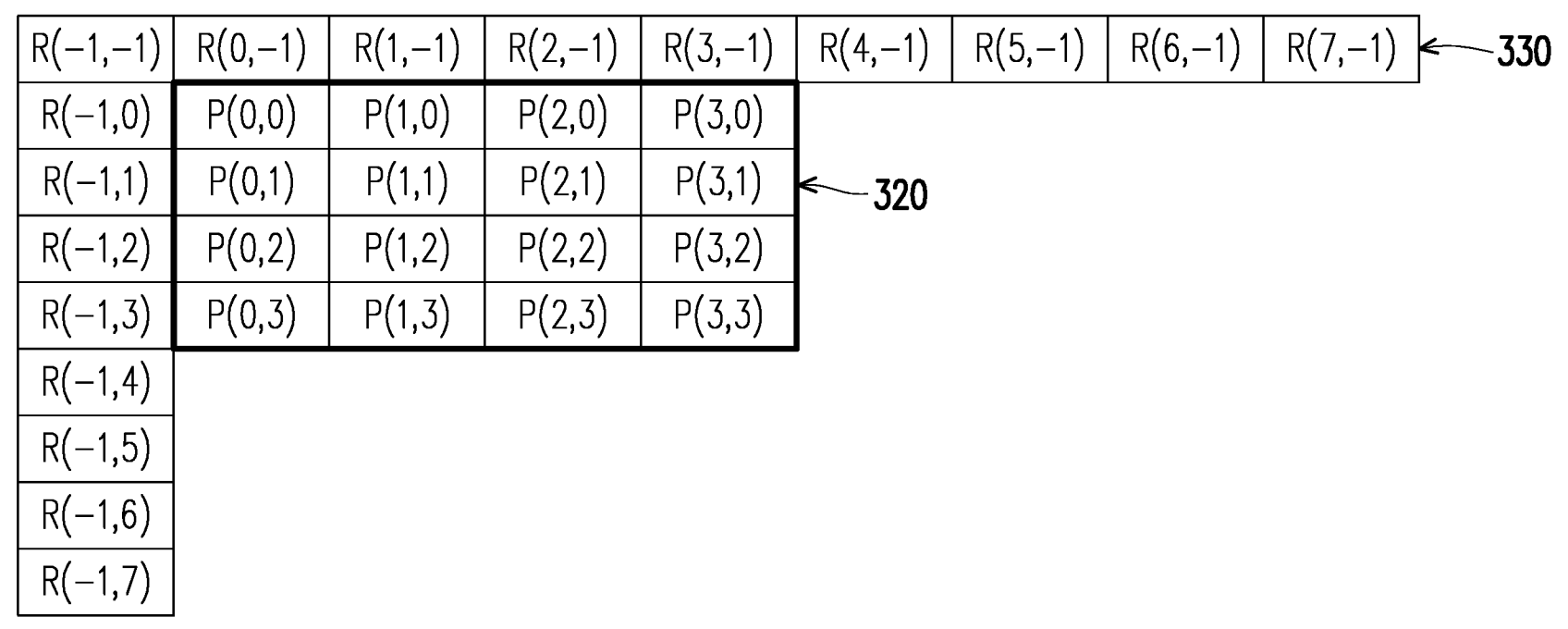
Figure 3C:
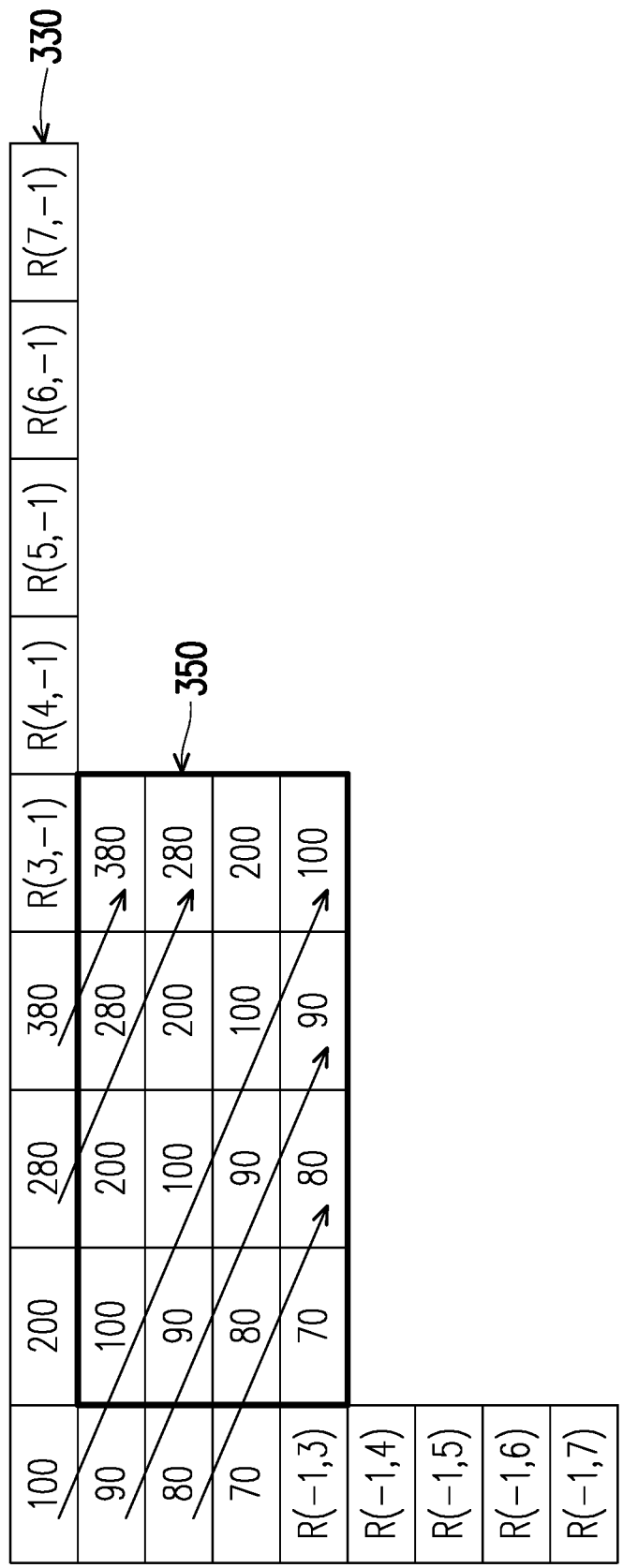

FIGS. 3A to 3C illustrate an implementation example for prediction with reference to neighboring reconstructed image samples during intra prediction. As shown in FIG. 3A, a block unit is exemplified by a current coding unit (CU) 320 having a size of M×M, and M is any positive integer, but is not limited thereto. The current CU 320 may obtain a predictor after image prediction. A neighboring RT 330 is used as reference samples, including reference samples R(−1, −1), R(x, −1) and R(−1, y), and 16 predictors P(x, y) are obtained after image prediction operation. As shown in the figures, the 16 predictors such as P(0,0) to P(3,3) are obtained by referring to left segments of the samples R(−1, 7) to R(−1, 0), above segments of R(0, −1) to R(7, −1), and R(−1, −1) of a left-above pixel.

An actual example is illustrated in FIGS. 3B and 3C. The original value of the current CU 340 is as shown in FIG. 3B. After being calculated by the intra prediction method, the obtained 16 predictors P(x, y), such as an updated current CU 350, are as shown in FIG. 3C. The original P(2, 0) and P(3, 1) are changed from the original "300" to "280" according to the samples by referring to sample values in the particular prediction direction, and the original P(3,0) is changed from the original "400" to "380" according to the sample.

Figure 4C:
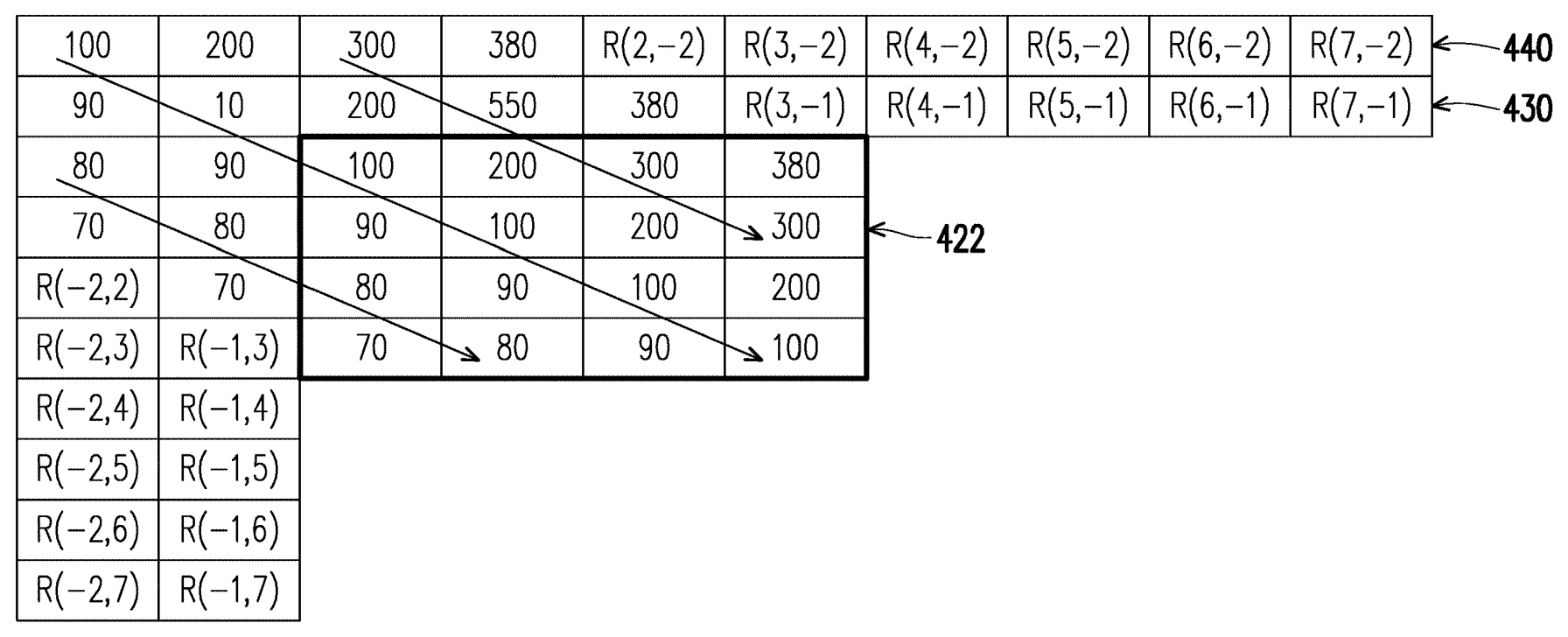

The fixed neighboring RT samples are used as a reference for prediction. There is a situation that if the neighboring RT reference samples are greatly different from the original sample in a certain particular direction, a large number of sample errors will be caused. An actual example is illustrated in FIGS. 4A to 4C. Values of an original current CU 410 are as shown in FIG. 4A. During the intra prediction, the intra prediction is performed in a diagonal direction mode by taking a neighboring RT 430 as samples, and 16 predictors in FIG. 4B are obtained by referring to the samples of the neighboring RT 430 on a diagonal, such as an updated current CU 420. It can be found by observing the neighboring RT 430 and another RT 440 that the sample difference therebetween is too great, which may possibly cause that the predictors may have the sample errors.

In another case, referring to FIG. 4C, the intra prediction is also performed in the diagonal direction mode. If the samples of the neighboring RT 430 are not used, samples of an RT 440 are used. After the obtained 16 predictors are updated, a current CU 422 is obtained, and it can be found that the problem of a too great difference observed in FIG. 4B may be avoided. Therefore, such an arrangement can avoid the potential sample error problem.

In addition, the resolution requirements for video contents are increasing at present. For example, super high resolutions of 16K and even 32K or more have been reached. In order to meet such requirements, increasing of the size of a coding block can improve the coding efficiency, so the size of the coding block is from 16×16 of H.264 (Advanced Video Coding) to 64×64 of H.265 (HEVC), and to the latest 128×128 of H.266. Under the condition of higher and higher resolution conditions, pixels inside the coding block are more sensitive in an angular prediction mode than pixels outside the coding block. Therefore, the sample error problem may be more obvious at a high resolution.

An implementation example of a video encoding apparatus proposed by the disclosure provides a method of adaptive filtering for a multiple reference line (MRL) of intra prediction in video coding.

In various embodiments of the disclosure, the method of the MRL for intra prediction in video coding is provided. In this method, reconstructed image samples in a composed tier (CT) are used to perform the intra prediction operation, and the CT includes two or more RTs. In various other implementation examples, reconstructed image samples in a plurality of RTs may also be directly used to perform the intra prediction operation. The above intra prediction can improve the intra prediction accuracy.

The intra prediction operation adopted by the JEM is taken as an example. In an implementation example of the disclosure, an architecture of arbitrary reference tier coding (ARTC) is provided, so as to implement the intra prediction operation by using the MRL, and the prediction may be performed independently with reference to each RT. Each RT independently undergoes a mode decision algorithm, including that in consideration of rough mode decision (RMD), rate-distortion optimization (RDO), and Transform Unit Decision (TUD), whether to make a decision is determined. In another implementation example of the disclosure, an IPM and a corresponding RT are simultaneously determined via two-stage selection, namely the operations in the RMD and the RDO.

In another embodiment, an adaptive filtering technology is further provided, so as to dynamically determine whether to use a filter to further reduce the complexity of intra prediction. Based on the above, the MRL is used as a reference, and the adaptive filtering technology is adopted, so that the compression efficiency of a super high resolution video may be improved, and the computational complexity may be reduced.

Figure 5A:
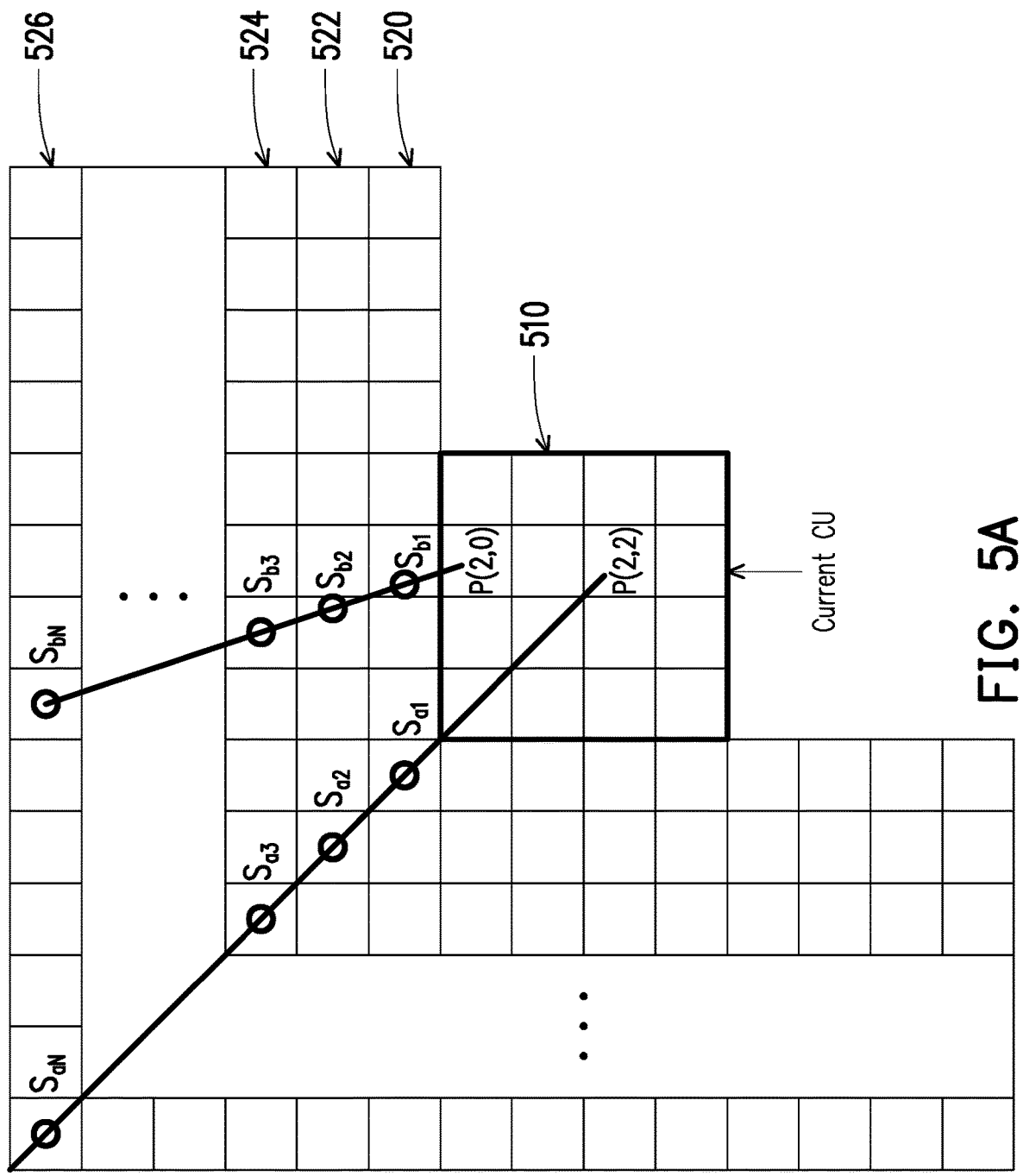
FIGS. 5A to 5C are schematic diagrams illustrating a method of a multiple reference line (MRL) for intra prediction according to a plurality of implementation examples of the disclosure.
Figure 5B:
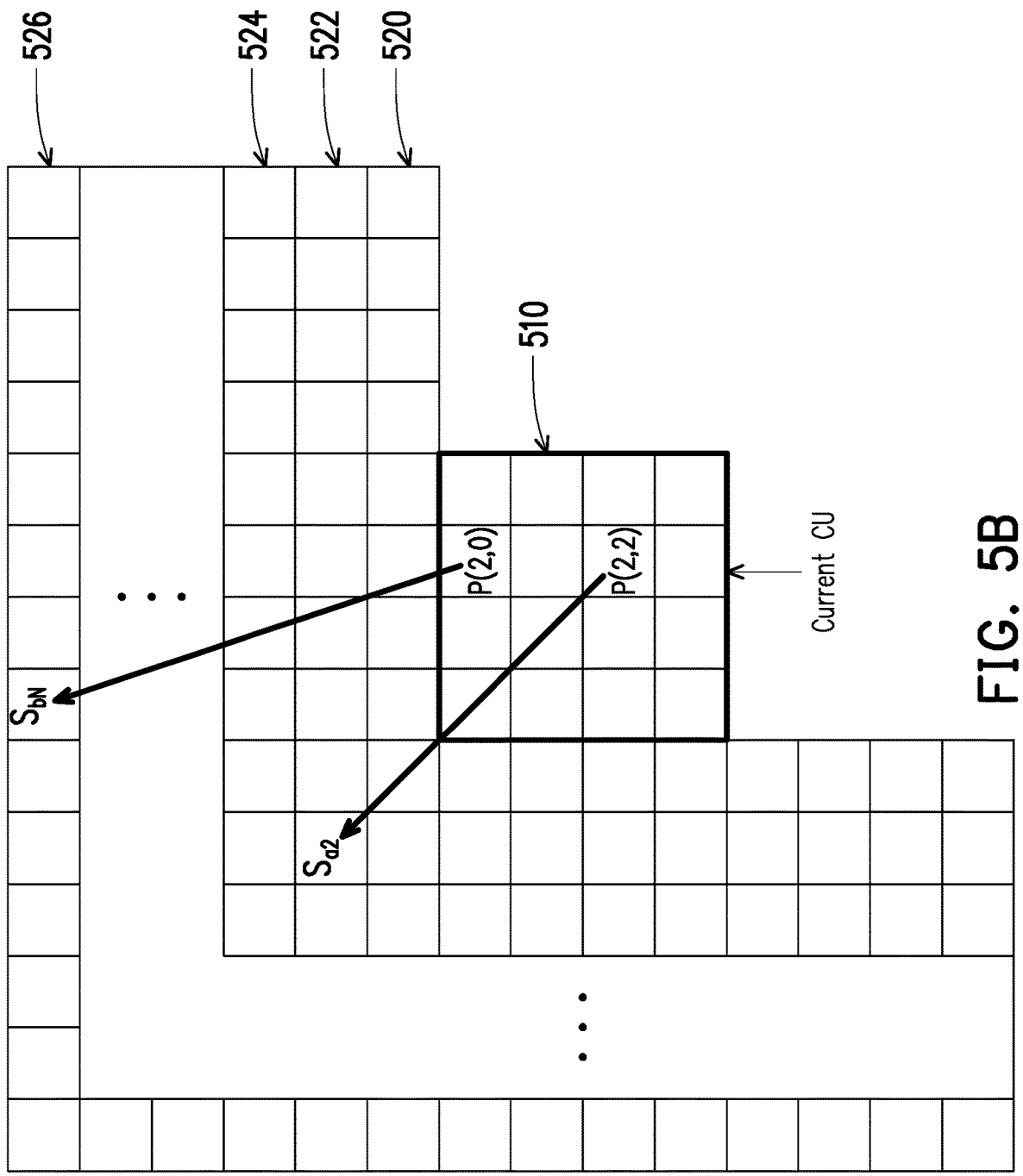
Figure 5C:
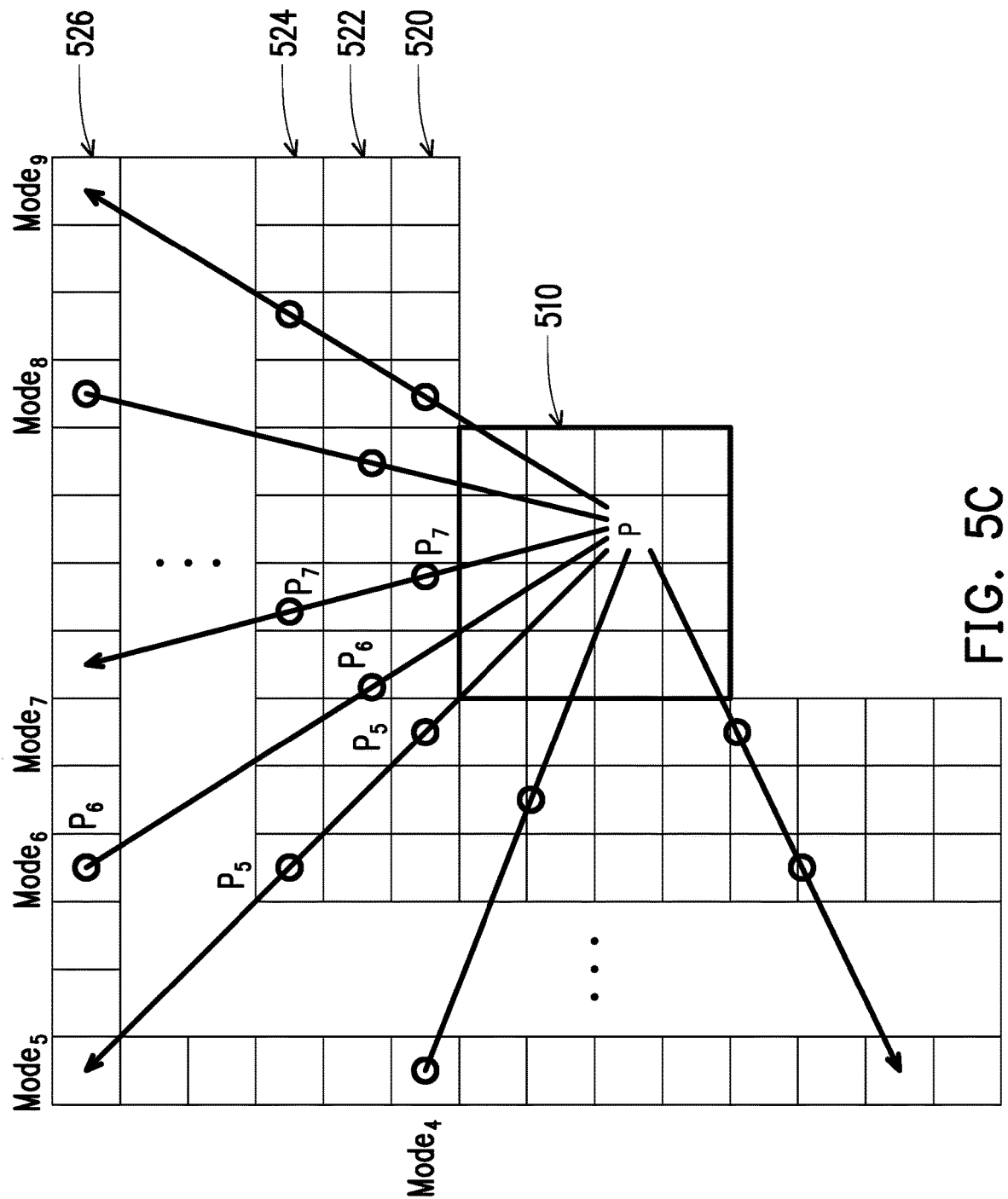

FIGS. 5A to 5C are schematic diagrams illustrating a method of a multiple reference line (MRL) for intra prediction according to a plurality of implementation examples of the disclosure. Firstly, referring to FIG. 5A, when a current CU 510 performs intra prediction operation, samples of 1 to N RTs may be used for prediction, and N may be any positive integer. The intra prediction operation used by the JEM is taken as an example. 67 IPMs may select RTs therein to perform the intra prediction operation to generate predictors. Different predictors P(x, y) may be generated by different independent RTs. For example, as shown in FIG. 5A, the predictor P(2, 2) may be generated by reference samples $S_{a1}, S_{a2}, S_{a3}, \ldots,$ or $S_{aN}$, and the predictor P(2, 0) may be generated by reference samples $S_{b1}, S_{b2}, S_{b3}, \ldots$ or $S_{bN}$. In the present embodiment, the reference sample $S_{a1}$ or $S_{b1}$ is located on a first RT 520; the reference sample $S_{a2}$ or $S_{b2}$ is located on a second RT 522; the reference sample $S_{a3}$ or $S_{b3}$ is located on a third RT 524, and the reference sample $S_{aN}$ or $S_{bN}$ is located on an Nth RT 526.

In another implementation example, referring to FIG. 5B, different predictors P(x, y) may be generated by different RTs. For example, the predictor P(2, 2) may be generated by the reference sample $S_{a2}$ of the second RT 522, and the predictor P(2, 0) may be generated by the reference sample $S_{bN}$ of the Nth RT 526.

In another implementation example, referring to FIG. 5C, different predictors P(x, y) may be generated by selecting combinations of different RTs via selecting different prediction modes (for different angles). That is, regardless of the 35 IPMs used by the HEVC or the 67 IPMs adopted by the JEM, in addition to the planar mode of Mode 0 and the DC Mode of Mode 1, other different IPMs for particular angles may select one or a combination of a plurality of different RTs to generate predictors. As shown in the figures, in one implementation example, a predictor P(x, y) may be generated by a combination of a reference sample of the first RT 520 and a reference sample of the third RT 524 under Mode 5. A predictor P(x, y) may be generated by a combination of a reference sample of the second RT 522 and a reference sample of the Nth RT 526 under Mode 6. A predictor P(x, y) may be generated by a combination of a reference sample of the first RT 520 and a reference sample of the third RT 524 under Mode 7.

According to the method of an MRL for intra prediction in video coding provided in various embodiments of the disclosure, the intra prediction operation may be performed by adopting a plurality of neighboring RTs through reconstructed image samples. For further consideration, the use of images samples of a plurality of neighboring RTs to perform the intra prediction operation may increase the computational complexity, so that more computations and a larger storage space are needed. In addition, the more complex computation will result in computation latency and the need for more gate counts to increase the cost of hardware implementation.

Various embodiments of the disclosure provide an adaptive filtering technology, so as to dynamically determine whether to use a filter to further reduce the complexity of intra prediction. Based on the above, the MRL is used as a reference, and the adaptive filtering technology is adopted, so that the compression efficiency of a super high resolution video may be improved, and the computational complexity may be reduced.

In various embodiments of the disclosure, the image samples of the MRL are used to perform the intra prediction operation, and the adaptive filtering technology is further provided to dynamically determine whether to use a filter and can be applied to a method of improving the smoothness of a reference sample, for example, to dynamically determine whether to use an RSAF. In another implementation example, the adaptive filtering technology is used to dynamically determine whether to perform the boundary filtering method. For example, the boundary filtering operation under the PDPC architecture is a prediction method for weighting for filtered edge reference samples and unfiltered edge reference samples in the intra prediction.

Figure 6:
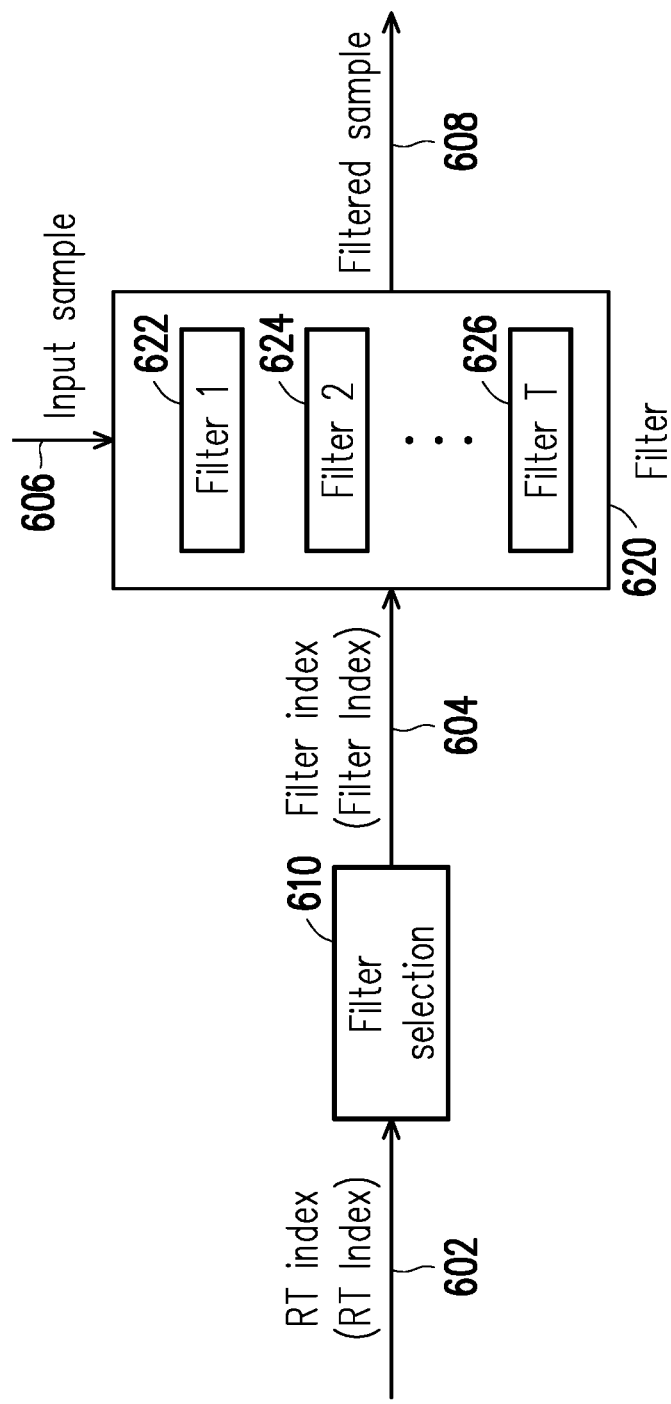
FIG. 6 is a flowchart illustrating a method of adaptive filtering for an MRL of intra prediction in video coding according to the disclosure.

Referring to FIG. 6, which is a flowchart illustrating a method of adaptive filtering for an MRL of intra prediction in video coding according to the disclosure, HEVC provides a mode-dependent reference sample smoothing method, and the JEM further provides a method for improving the smoothness of a reference sample, which is called an RSAF. Two low pass filters (LPFs) are used during smoothing of reference samples.

One implementation example of the disclosure provides an Adaptive Reference Filtering Scheme (ARFS). As shown in FIG. 6, with reference to a plurality of reference filters such as a filter 1 622, a filter 2 624 and a filter T 626 included in a reference smoothing module 620, the filter may be selected corresponding to a filter index 604, the filtering operation is skipped or bypass, filtering is not performed, or an input sample is directly output as a filtered sample.

This filter index 604 is generated via a filter selection process 610. The filter selection process 610 generates the filter index 604 corresponding to an intra-coded coding unit (CU). The intra-coded CU is generated by judgment of a content of an MRL index, and the MRL index may be an index of a CT or a plurality of RTs. An RT index 602 is taken as an example, and may be known as the MRL index in another embodiment. The intra-coded CU determines the filter corresponding to the filter index or determines not to perform the filtering operation. If the filter index 604 includes an index t, the filter t will be used to filter input samples 606, namely reference samples of the intra-coded CU to generate filtered samples 608. In case of information of the filter index 604, the filtering operation is skipped or bypass, the filtering is not performed, or the input samples 606 are directly output as the filtered samples 608.

In various embodiments of the disclosure, the intra prediction operation is performed by using the image samples of the MRL, so that whether to adopt the adaptive filtering technology is determined by using the contents of the MRL index, so as to determine to skip or bypass the filtering operation, not to perform the filtering, or to directly output the input samples as the filtered samples. The adaptive filtering technology architecture is based on that if the intra prediction operation is performed by using the image samples of the MRL, the filtering operation does not need to be performed, so that the compression efficiency of a super high resolution video may be improved, and the computational complexity may be reduced.

In various embodiments of the disclosure, the syntax design of the MRL index may be adjusted as required. For related contents, refer to the syntax contents, generated by different applications, of the MRL index and an order of IPMs used in the related intra prediction in the U.S. provisional application No. 62/691,729 and/or the U.S. provisional application No. 62/727,595 filed in the present application. This is incorporated by reference and as a part of the disclosure. For example, in one implementation example, the contents of the MRL index may be placed behind IPM related contents in VVC.

The syntax contents of the MRL index, in one implementation example, at least includes one flag indicating that one or a combination of a plurality of different RTs generates the intra prediction of the MRL or a combination of the CT and/or the RTs performs the intra prediction of the MRL.

According to the contents of the MRL index, in one embodiment, for example, {0, 1, 2, 3} or {0, 1, 3} is included. If the value of the index is "0", the value of the filter index is set to "1". If the value of the index is not equal to "0", the value of the filter index is set to "0". When the value of the filter index is "1", the filtering operation is performed to generate the filtered samples. When the value of the filter index is "0", the input samples are directly output as the filtered samples. That is, the filter selection process includes, for example, two modes. One is called a direct mode in which the filter corresponding to the filter index is selected to perform the filtering operation to generate a filtered sample. The other mode is a skip mode that skips or bypass the filtering operation to directly output the input samples as the filtered samples 608. The design of the above MRL index syntax is only one of a plurality of implementation examples, and may be adjusted according to applications, and is not limited thereto. The design of the MRL index syntax may be used as the basis for interpreting the syntax context during encoding or decoding.

Figure 7A:
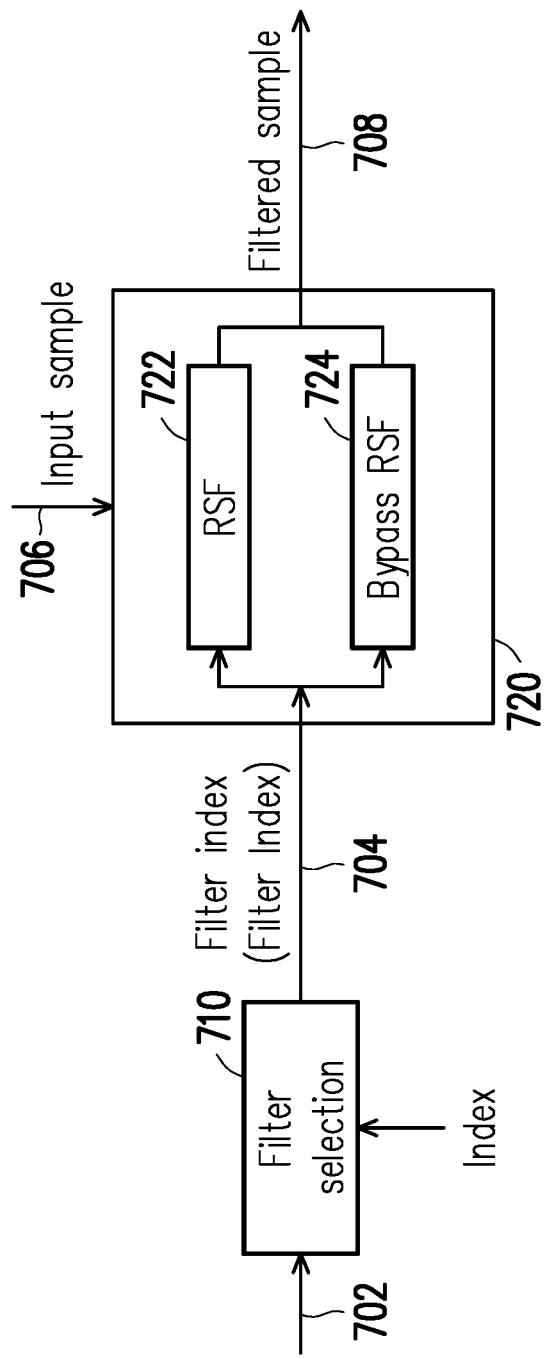
FIGS. 7A and 7B are flow diagrams illustrating whether to perform smoothing filtering operation according to an intra-coded coding unit (CU) in a plurality of implementation examples of the disclosure.
Figure 7B:
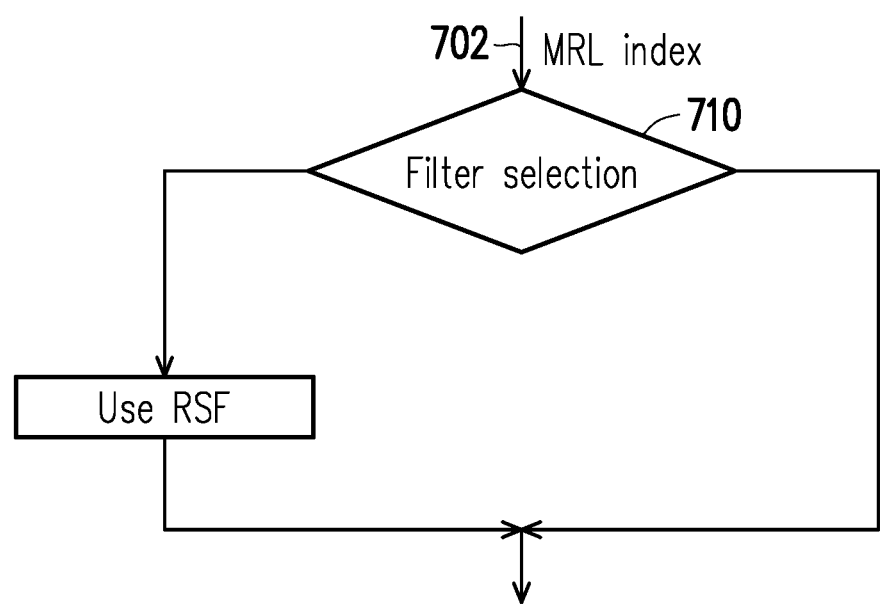

FIGS. 7A and 7B are flow diagrams illustrating whether to perform smoothing filtering operation according to an intra-coded CU.

As shown in FIG. 7A, a reference smoothing module 720 performs a Reference Smoothing Filtering (RSF) process 722 and another RSF-skipping or bypass process 724 that does not perform the filtering operation according to a received filter index 704. That is, a filter is selected corresponding to the filter index 704, and the RSF process 722 is performed on input samples 706, namely reference samples of the intra-coded CU, to generate filtered samples 708. If the filter index 704 indicates that the filtering smoothing operation is skipped or bypass or not performed, the input samples 706 are directly output as the filtered samples 708. This filter index 704 is generated via a filter selection process 710. The filter selection process 710 generates the filter index 704 corresponding to the intra-coded CU according to information in an MRL index 702. As shown in FIG. 7B, the filter selection process 710 is performed according to the information in the MRL index 702, so as to determine whether to perform the RSF process S722 on the input samples 706, or perform the RSF-skipping or bypass process 724 to skip or bypass the filtering smoothing operation, not perform the filtering smoothing or directly output the input samples 706 as the filtered samples 708.

Figure 8A:
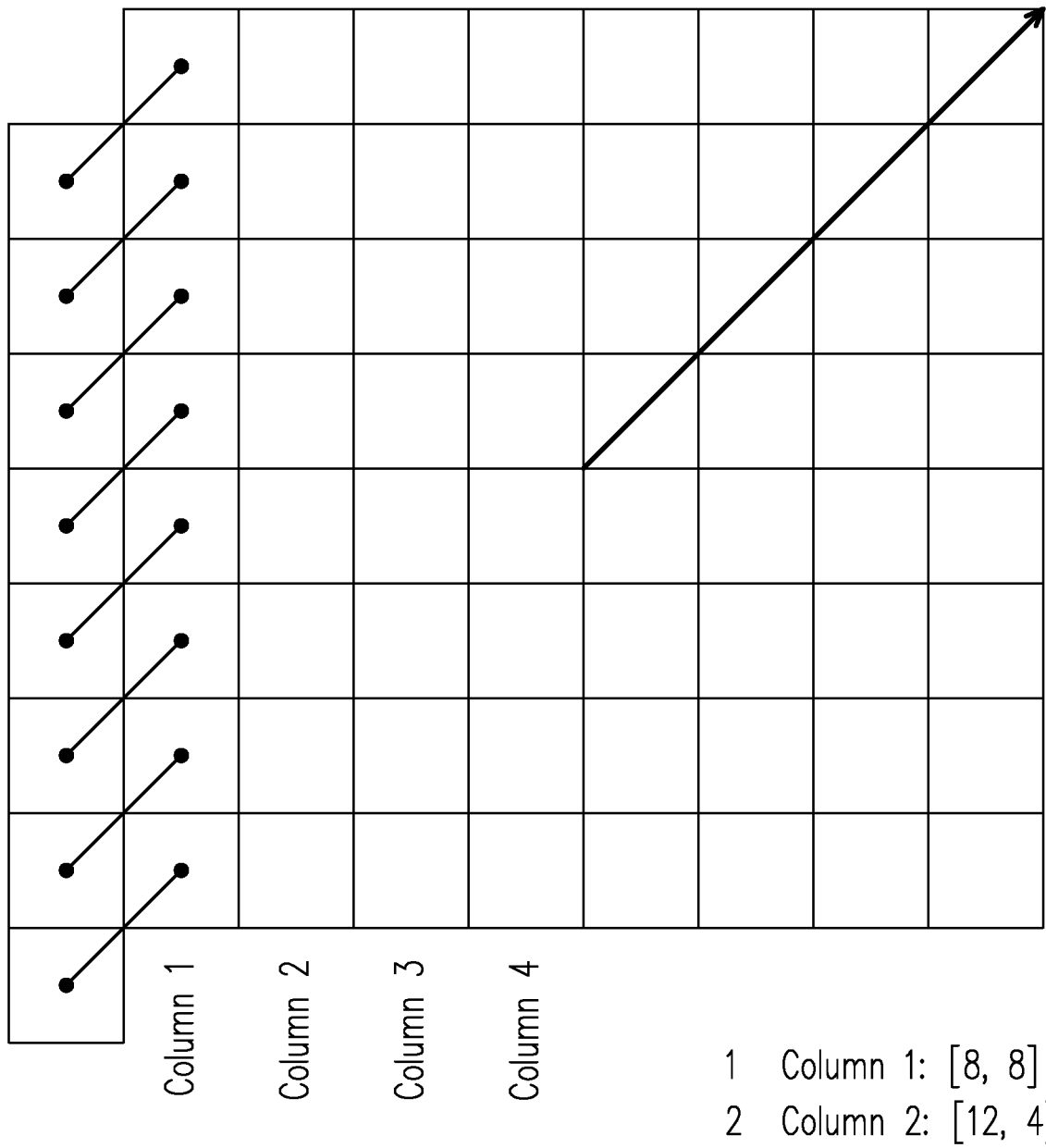
FIGS. 8A and 8B are flow diagrams illustrating boundary filtering.
Figure 8B:
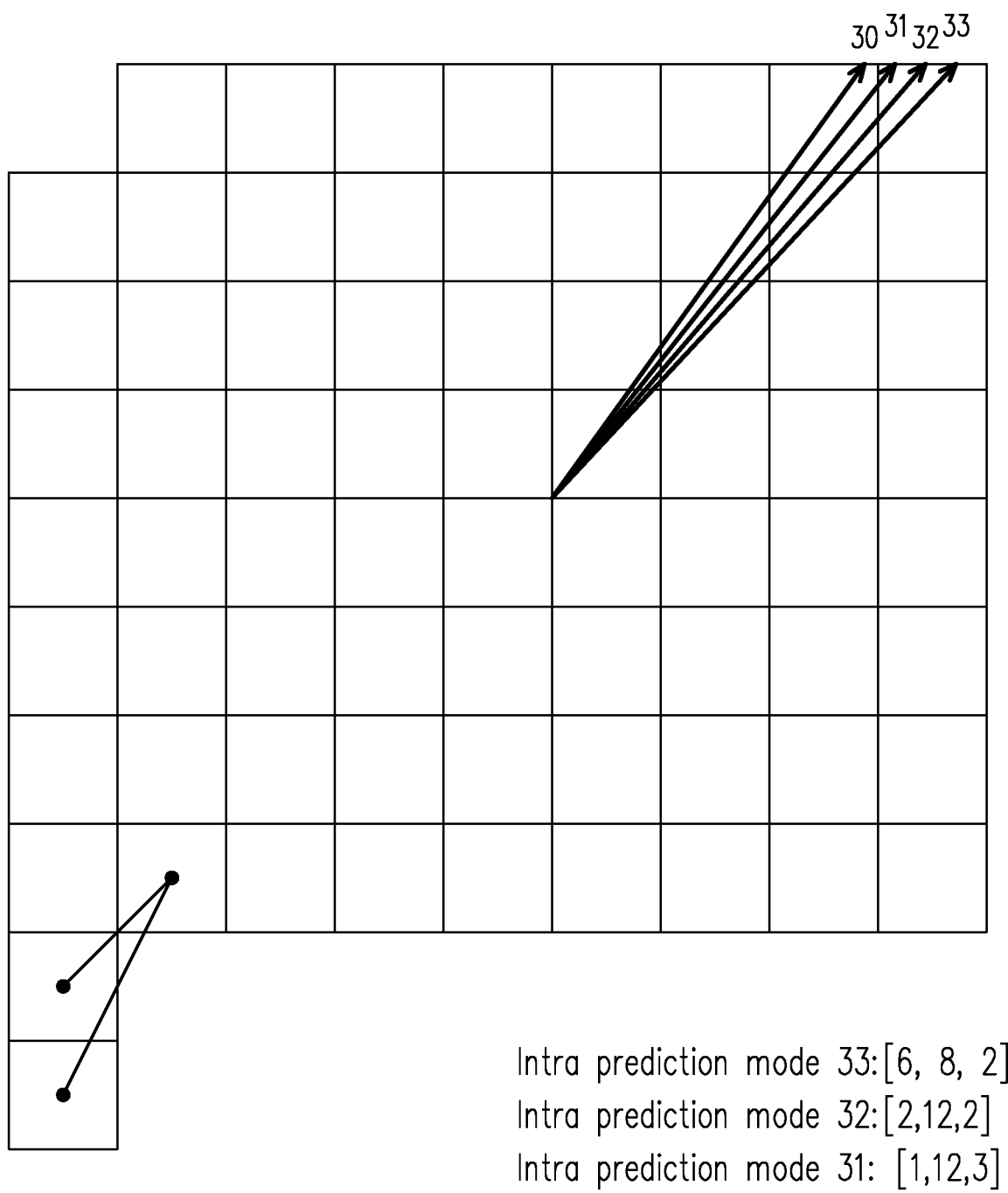

Determining whether to adopt the adaptive filtering technology by using the contents of the MRL index also may be applied to boundary filtering operation under, for example, a PDPC architecture. The PDPC can be regarded as a boundary filtering technology which combines a boundary filtering process with an intra prediction process into a single equation. As for the boundary filtering technology, FIGS. 8A and 8B illustrate the boundary filtering process. After the boundary filtering method generates an intra prediction block via a vertical intra mode (VER) and a horizontal intra mode (HOR) under, for example, the HEVC architecture, predicted samples in a left-most column and a top-most row need to be further adjusted respectively. This method is further implemented under several diagonal intra modes in the JEM, while boundary samples are added into four columns or rows for adjustment by using a two-tap filter or a third-tap filter. As shown in FIG. 8A, it can be known that in the IPM with the mode number of 34, the second-tap filter is used to adjust the boundary samples. As shown in FIG. 8B, it can be known that in the IPMs with the mode numbers of 30 to 33, the three-tap filter is used to adjust the boundary samples.

Figure 9A:
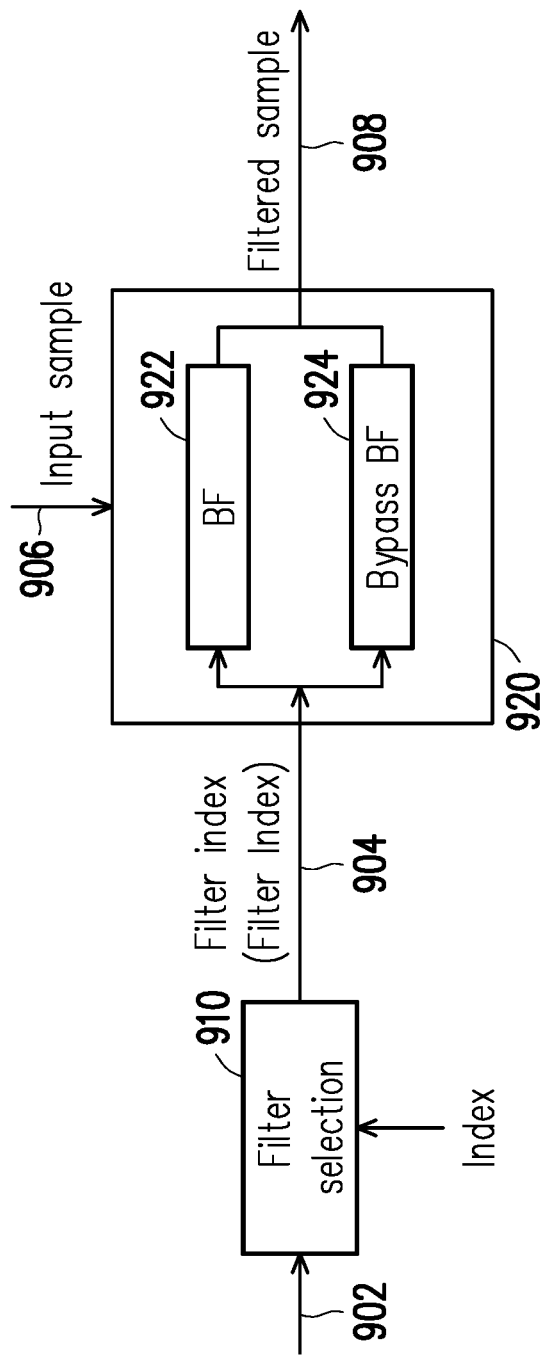
FIGS. 9A and 9B are flow diagrams illustrating whether to perform boundary filtering operation according to an intra-coded CU.
Figure 9B:
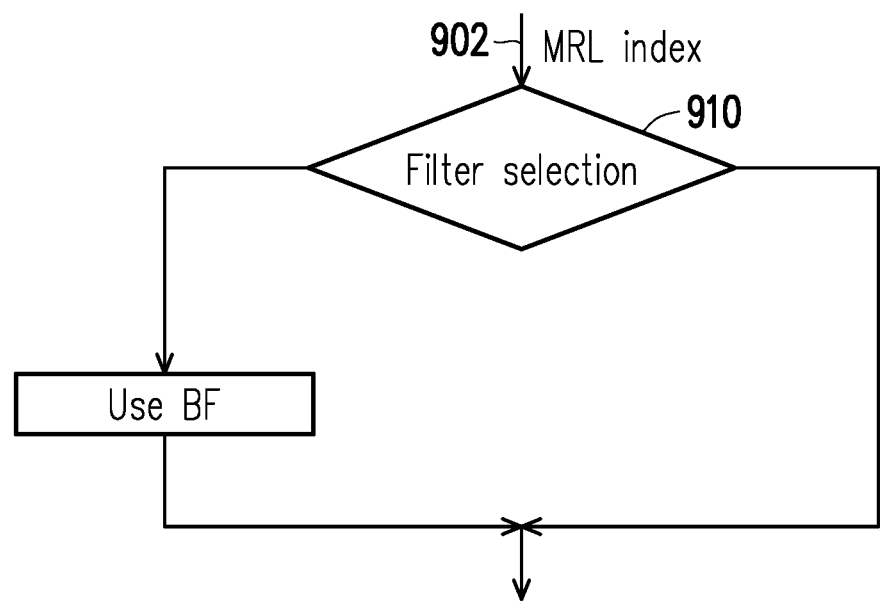

In various embodiments of the disclosure, the contents of the MRL index are used to determine whether the adaptive filtering technology is adopted, so as to determine whether to use a filter, that is, whether to skip, bypass or to not perform the filtering operation. The general IPM may initiate the boundary filtering operation under the above PDPC architecture, but if the intra prediction operation is performed by using the image samples of the MRL, the PDPC operation is not needed. Therefore, the adaptive filtering technology architecture may consider that if the intra prediction operation is performed by using the image samples of the MRL, the PDPC operation is not needed, so that compression efficiency of the super high resolution film may be improved, and the computational complexity may be reduced. Refer to FIGS. 9A and 9B, which are flow diagrams illustrating whether to perform boundary filtering operation according to an intra-coded CU.

As shown in FIG. 9A, a boundary filter module 920 determines whether to perform a boundary filtering process (represented by "BF") 922 and another BF-skipping or bypass process 924 that does not perform the boundary filtering operation according to a received filter index 904. That is, whether to perform the boundary filtering process is selected according to the filter index 904, and filtered samples 908 are generated. This filter index 904 is generated via a filter selection process 910. The filter selection process 910 generates the filter index 904 corresponding to an intra-coded CU according to information in an MRL index 902. As shown in FIG. 9B, the filter selection process 910 is performed according to the information in the MRL index 902, so as to determine whether to perform the boundary filtering process 922 on input samples 906, or perform the BF-skipping or bypass process 924 to skip or bypass the boundary filtering operation, not perform the boundary filtering or directly output the input samples 906 as filtered samples 908.

In various embodiments of the disclosure, an encoding process of the method of an MRL for intra prediction in video coding is provided. The overall architecture may be described with reference to FIG. 10. The intra prediction operation for the MRL provided by the disclosure refers to FIG. 10. Basically, the intra prediction is divided into several processes, including a reference sample filtering process S1010, an intra prediction process S1020, a boundary filtering process 51030, a rate-distortion optimization (RDO) process S1040 and a syntax generation process S1050.

The reference sample filtering process S1010 is as shown in FIG. 7B: a determination step S1012 is executed according to the information in the MRL index, so as to confirm whether to perform an RSF process S1014 on input samples, or skip, bypass or not perform filtering smoothing operation (skip the RSF). The intra prediction process S1020 is as follows: a best prediction mode decision method S1022 is used to select a best prediction mode.

The boundary filtering process 51030 is as shown in FIG. 9B: a determination step S1032 is executed according to the information in the MRL index, so as to determine whether to perform a boundary filtering (BF) process 51034 on input samples, or skip, bypass or not perform the boundary filtering operation (skip the BF). The RDO process S1040 is as follows: an RDO method is used to check and calculate a plurality of distortion costs corresponding to a plurality of candidate prediction modes under a plurality of transform indexes based on blocks and prediction costs corresponding to the plurality of candidate prediction modes, so as to obtain a selection of optimal bit rate and distortion.

The syntax generation process S1050 includes reference line syntax selection or writing step S1052, a most probable mode (MPM) flag selection or writing step S1054, and an MPM parameter/angular mode index reference line syntax selection or writing step S1065.

Figure 11:
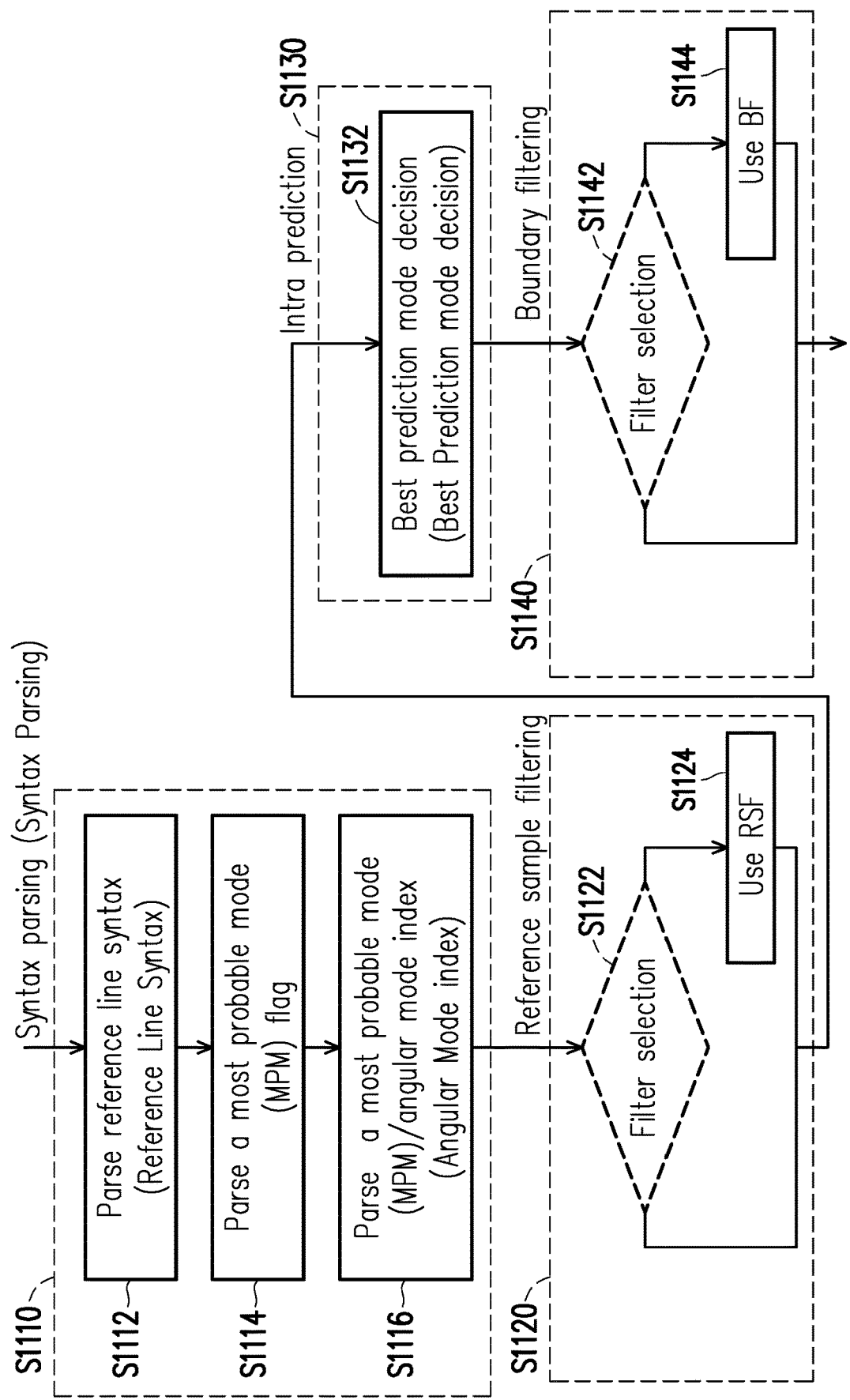
FIG. 11 is a decoding flow diagram illustrating a method of an MRL for intra prediction in video coding according to a plurality of embodiments of the disclosure.

In various embodiments of the disclosure, a decoding process of the method of an MRL for intra prediction in video coding is provided. The overall architecture may be described with reference to FIG. 11. The intra prediction operation of the MRL provided by the disclosure refers to FIG. 11. Basically, the intra prediction is divided into several processes, including a syntax parsing process S1110, a reference sample filtering process S1120, an intra prediction process S1130 and a boundary filtering process S1140.

The syntax parsing process S1110 includes a reference line syntax parsing step S1112, an MPM flag parsing step S1114 and an MPM index/angular mode index parsing step S1116.

The reference sample filtering process S1120 performs the determination step S1112 according to the information in the MRL index, so as to confirm whether a sample has undergone the RSF process. If the RSF process is already performed, the step S1124 is adopted, and if the RSF process is not performed, the RSF process is directly skipped, and the intra prediction process S1130 is continued. The intra-screen prediction process S1130 selects a prediction mode according to the best prediction mode decision method S1132.

The boundary filtering process S1140 performs a determination step S1142 according to the information in the MRL index, so as to determine whether to perform the BF processing on the input samples, or skip, bypass and not perform the boundary filtering operation (skip the BF). If the BF processing is already performed, the step S1114 is adopted, and if the BF is not performed, the boundary filtering process S1140 is directly skipped.

Figure 12:
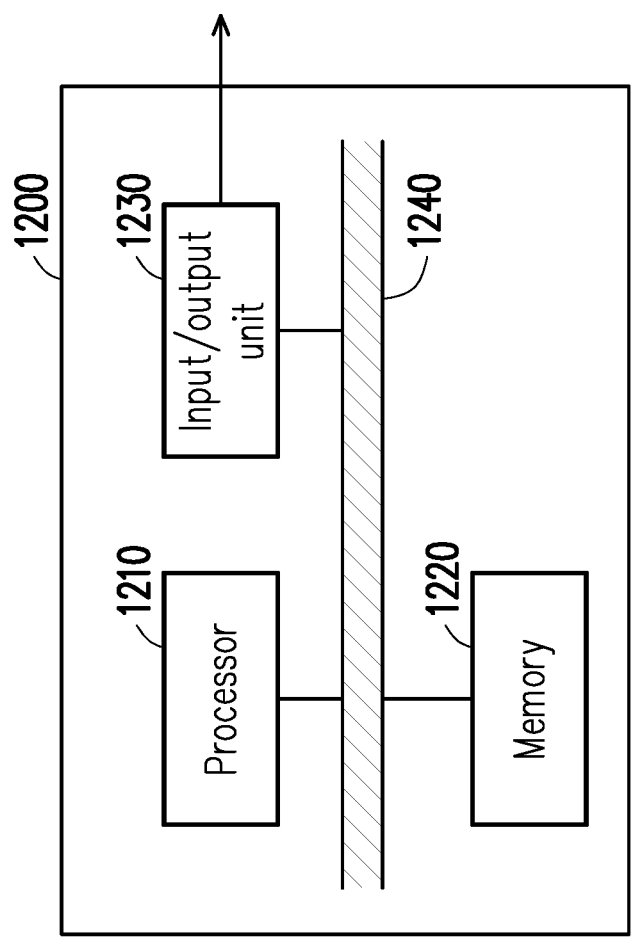
FIG. 12 is a block diagram illustrating an example video processing apparatus configured to perform intra prediction operation by using an image sample of an MRL provided by the disclosure.

FIG. 12 is a block diagram illustrating an example video processing apparatus configured to perform intra prediction operation by using an image sample of an MRL provided by the disclosure. The video processing apparatus 1200 can be used in a video encoder or in a video decoder. The encoder is described herein. In one implementation example, the video processing apparatus 1200 may include a processor 1210, a memory 1220, an input/output unit 1230 and a data bus unit 1240.

The processor 1210 is implemented in the form of hardware and software to perform intra prediction operation by using image samples of an MRL provided by the disclosure. The processor 1210 can be implemented as one or more central processing unit (CPU) wafers, a field-programmable gate array (FPGA), an application specific integrated circuit (ASIC), a digital signal processor (DSP), etc. The processor 1210 communicates with the memory 1220 and the input/output unit 1230 through the data bus unit 1240 to receive or transmit data. The processor 1210 may be implemented by accessing instructions stored in the memory 1220.

The memory 1220 is configured to store a program to be executed, and store instructions and data which are read during the execution of the program. The memory 1220 may be a volatile memory and/or a non-volatile memory (NVM). The NVM may be, for example, a read-only memory (ROM), or a flash memory or the like. The ROM may be, for example, a programmable read-only memory (PROM), an electrically alterable read only memory (EAROM), an erasable programmable read only memory (EPROM), an electrically erasable programmable read only memory (EEPROM), and the like. The volatile memory may be, for example, a random access memory (RAM), a dynamic random access memory (DRAM), or a static random access memory (SRAM), or the like.

Figure 10:
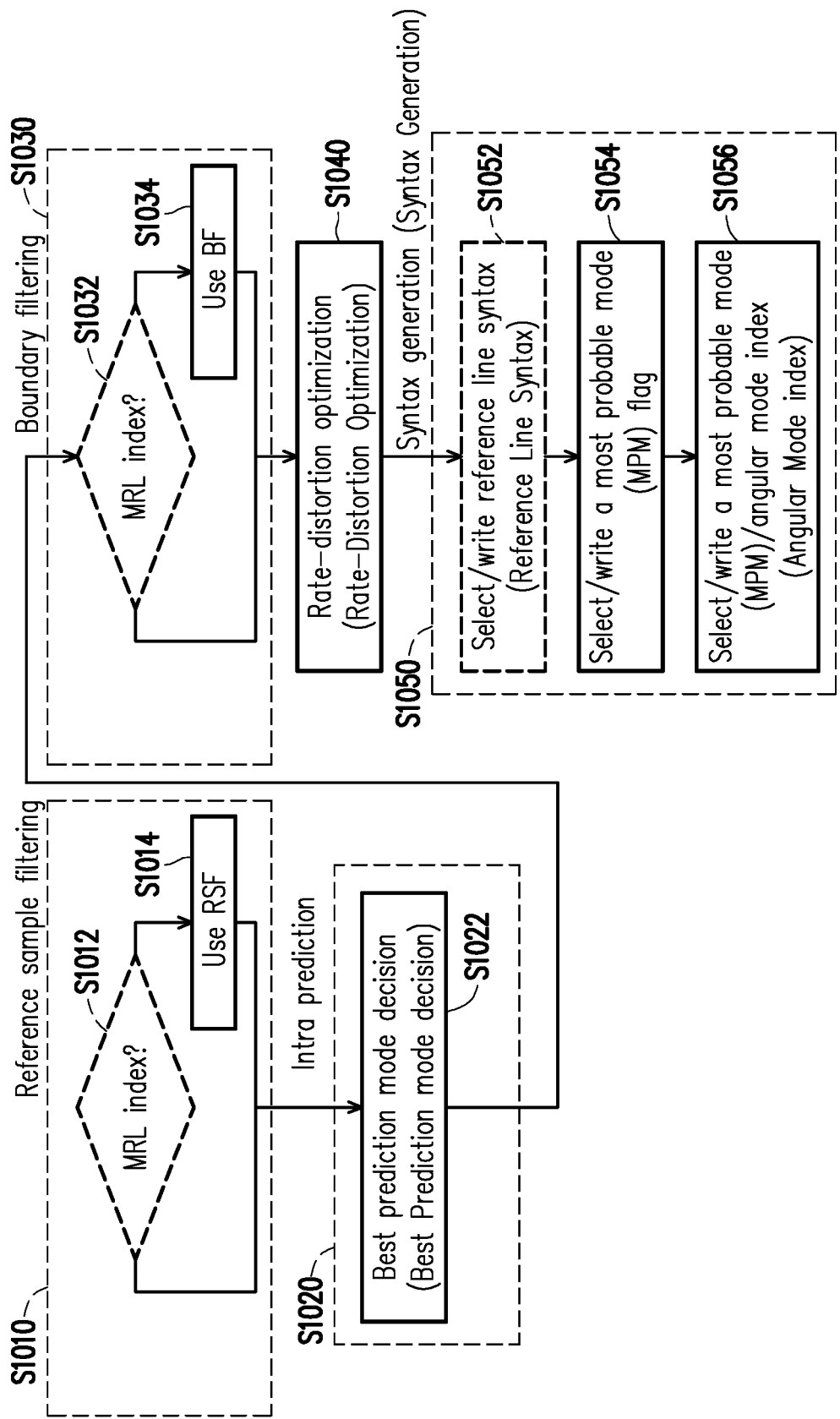
FIG. 10 is an encoding flow diagram illustrating a method of an MRL for intra prediction in video coding according to a plurality of embodiments of the disclosure.

The architecture of the video processing apparatus 1200 according to FIG. 12 is configured to perform the encoding process of the method of an MRL for intra prediction provided in FIG. 10. The processor 1210 is configured to implement video coding, including an intra prediction function, and may perform the encoding process of the method of an MRL for intra prediction provided in FIG. 10, including a reference sample filtering process S1010, an intra prediction process S1020, a boundary filtering process S1030, a rate-distortion optimization (RDO) process S1040, a syntax generation process S1050, and the like.

Figure 13:
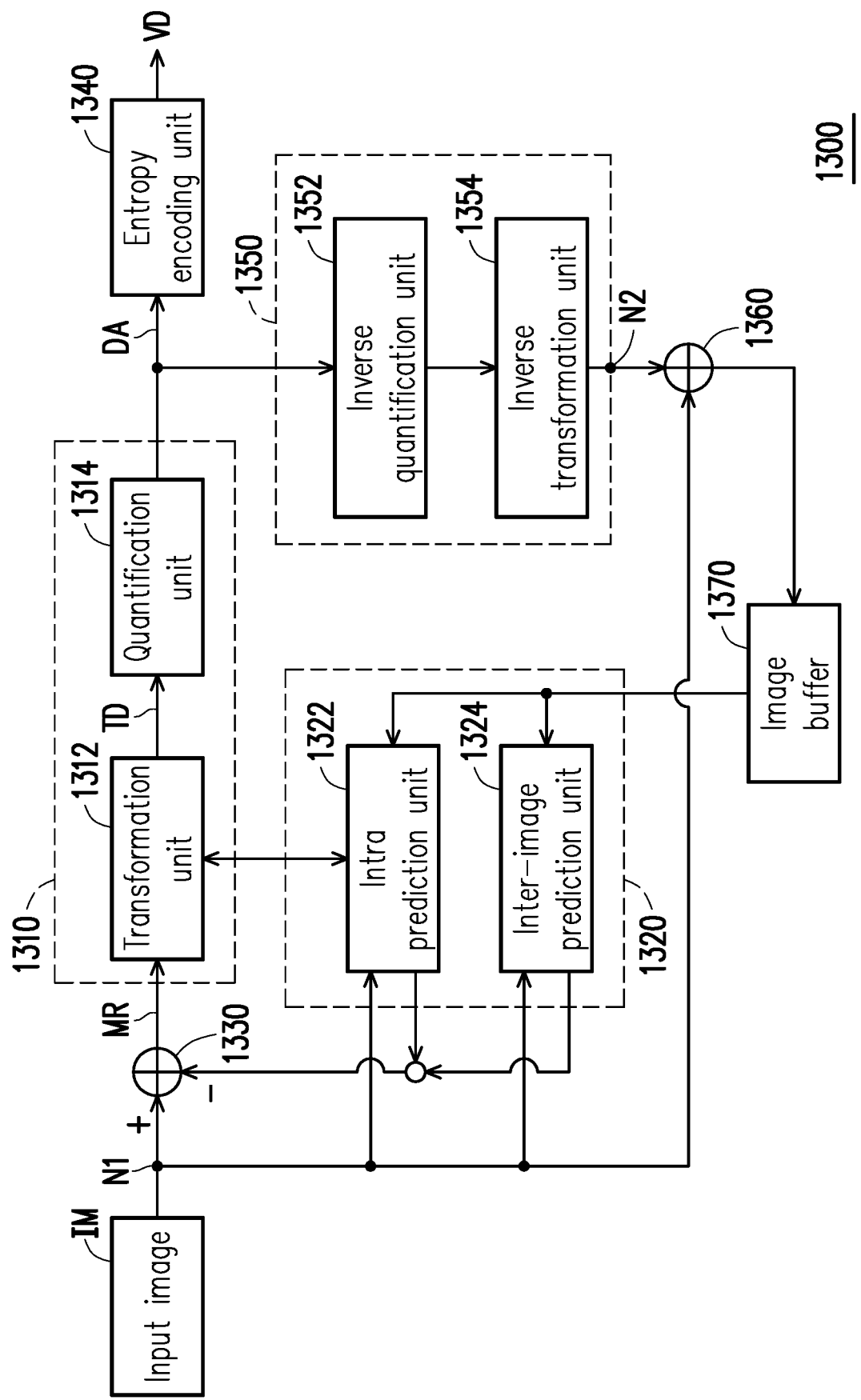
FIG. 13 is a structural block diagram illustrating a video encoding apparatus (Encoder) according to an embodiment of the disclosure.

In FIG. 12, the video processing apparatus 1200 configured to perform the intra prediction operation by using the image samples of the MRL is used in a video encoding apparatus (Encoder), referring to the structural block schematic diagram of FIG. 13. FIG. 13 is a structural block diagram illustrating a video encoding apparatus according to an embodiment of the disclosure. Video coding used by the video encoding apparatus 1300 may be a joint exploration test platform (JEM). The video encoding apparatus 1300 includes an integrated circuit, and various units illustrated in FIG. 13 may form a hardware circuit block interconnected with a circuit bus. The hardware circuit may be a separate circuit, or two or more of separate circuits may be combined into a shared hardware circuit. In some examples, one or more of the units illustrated in FIG. 13 may be software units executed on a processing circuit. In such an example, a program code for such a software unit is stored in a memory. An operating system may cause the video encoding apparatus 1300 to retrieve and execute the program code from the memory, so that the video encoding apparatus 1300 performs the operations of the implementation examples. In some examples, the software unit may be firmware that is executed by the video encoding apparatus 1300 at a booster. Thus, the video encoding apparatus 1300 is a structural component having hardware that executes the example technologies or software/firmware that is executed on hardware to specialize the hardware that executes the example technologies.

The video encoding apparatus 1300 of the present embodiment includes a transformation and quantification unit 1310, a prediction unit 1320, an adder 1330 located at the input end N1 of the video encoding apparatus 1300, an entropy encoding unit 1340, an inverse quantification and inverse transformation unit 1350, an adder 1360 located at the output end N2 of the inverse quantification and transformation unit 1350, and an image buffer 1370. The transformation and quantification unit 1310 includes a transformation unit 1312 and a quantification unit 1314. The prediction unit 1320 includes an intra prediction unit 1322 and an inter-image prediction unit 1324. The adder 1330 subtracts an input image IM by information (such as a predictor) supplied by the prediction unit 1320 to obtain a residue MR of the input image (IM).

The transformation unit 1312 performs transformation using, for example, a non-separable secondary transform (NSST) technology. The transformation unit 1312 transforms the residue MR of the IM. The data TD subjected to the residue transformation by the transformation unit 1312 is processed by the quantification unit 1314 into data DA, and then the data DA is processed by the entropy encoding unit 1340 into compressed video data (VD). The VD also may include, in addition to the data DA, various intra prediction modes and inter-image prediction modes which are generated by the prediction unit 1320.

In order to simulate video decoded data, the video encoding apparatus 1300 uses an inverse quantification unit 1352 and an inverse transformation unit 1354 in the inverse quantification and inverse transformation unit 1350 to restore the data DA into video decoded image data. The image data is temporarily stored in the image buffer 1370 after being processed by the adder 1360 and the IM. The video decoded image data may be used by the intra prediction unit 1322 and the inter-image prediction unit 1324 as a mode for prediction of a current block. The intra prediction unit 1322 performs pixel value prediction and residue transformation on a block being processed by using parsed blocks in the same image. The inter-image prediction unit 1324 performs the pixel prediction and residue transformation on blocks between a plurality of continuous input images. That is, the prediction unit 1320 is configured to generate predictors according to the received image data (input image data) and the video decoded image data (the parsed blocks in the same image).

The intra prediction unit 1322 is configured to receive an index, perform filter selection according to the index to generate a filter index corresponding to the index, and select a filter corresponding to the filter index for filtering operation, or directly output the received image data (input image data) as filtered samples.

Figure 14:
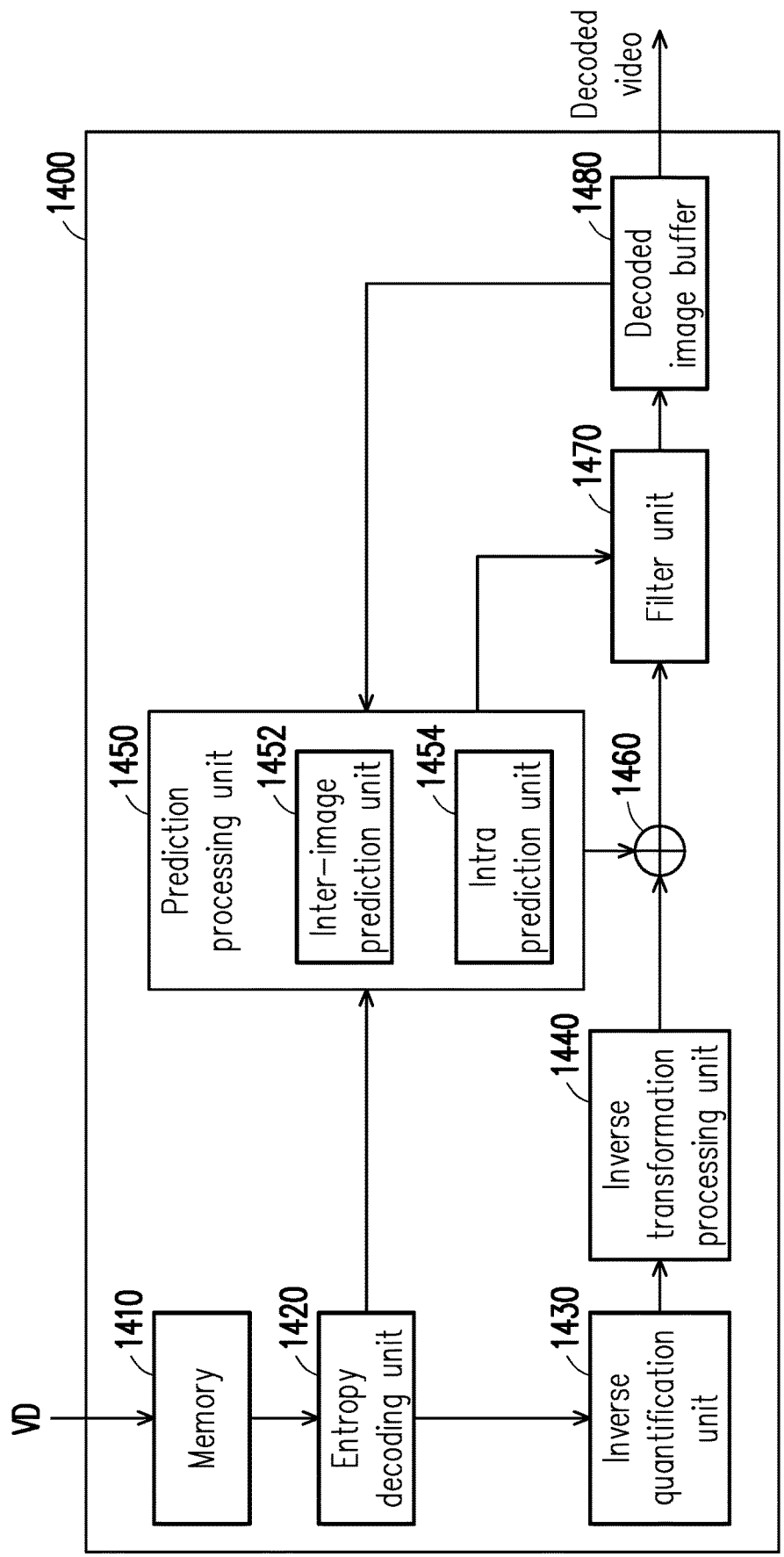
FIG. 14 is a structural block diagram illustrating a video decoding apparatus (Decoder) according to an embodiment of the disclosure.

The video processing apparatus 1200 configured to implement the intra prediction operation by using the image samples of the MRL in FIG. 12 is applied to a video decoding apparatus (Decoder), referring to the structural block diagram of FIG. 14. The video decoding apparatus 1400 includes an integrated circuit, and the various units illustrated in FIG. 14 may form a hardware circuit block interconnected with a circuit bus. The hardware circuit block may be a separate circuit, or a combination of two or more of separate circuits may be combined into a shared hardware circuit block. In some examples, one or more of the units illustrated in FIG. 14 may be software units executed on a processing circuit. In such an example, a program code for such a software unit is stored in a memory. An operating system may cause the video decoding apparatus 1400 to retrieve and execute the program code, so that the video decoding apparatus 1400 performs the operations of the implementation technologies. In some examples, the software unit may be firmware that is executed by the video decoding apparatus 1400 at a booster. Thus, the video decoding apparatus 1400 is a structural component having hardware that executes the example technologies or software/firmware that is executed on hardware to specialize the hardware that executes the example technologies.

In the example of FIG. 14, the video decoding apparatus 1400 includes a video data memory 1410, an entropy decoding unit 1420, an inverse quantification unit 1430, an inverse transformation processing unit 1440, a prediction processing unit 1450, a reconstruction unit 1460, a filter unit 1470 and a decoded image buffer 1480. The prediction processing unit 1450 includes an inter-image prediction unit 1452 and an intra prediction unit 1454. In other examples, the video decoding apparatus 1400 may include more, fewer or different functional assemblies.

The entropy decoding unit 1420 may perform entropy decoding on an entropy encoded syntax element. The prediction processing unit 1450, the inverse quantification unit 1430, the inverse transformation processing unit 1440, the reconstruction unit 1460 and the filter unit 1470 may generate decoded video data based on syntax elements extracted from a bit stream, and the descriptions thereof are omitted herein. In the video decoding apparatus 1400, the intra prediction unit 1454 may perform the decoding process of the method of an MRL for intra prediction provided in FIG. 11, including a syntax parsing process S1110, a reference sample filtering process S1120, an intra prediction process S1130 and a boundary filtering process S1140. That is, the intra prediction processing unit 1454 is configured to obtain an index, confirm whether reference smoothing filtering (RSF) operation and/or boundary filtering operation are/is performed on decoded video data according to the index. The intra prediction processing unit 1454 indicates, according to the index, that when the intra prediction operation is performed by using the image samples of the MRL, the intra prediction unit determines that no RSF operation and/or boundary filtering operation are/is performed on the decoded video data according to the filter index.

In a plurality of embodiments of the disclosure, a method of an MRL for intra prediction in video coding is provided. In the method, the intra prediction operation is performed by using reconstructed image samples in a composed tier (CT). The CT includes two or more reference tiers (RTs). In a plurality of other implementation examples, the intra prediction operation also may be performed by directly using reconstructed image samples in a plurality of RTs. The above intra prediction may improve the intra prediction accuracy.

In another embodiment, an adaptive filtering technology is further provided, which dynamically determine whether to use a filter, so as to further reduce the complexity of the intra prediction. Based on the above, the MRL is used as a reference, and the adaptive filtering technology is adopted, so that the compression efficiency of a super high resolution video may be improved, and the computational complexity may be reduced.

According to the aforementioned content, one of a plurality of implementation examples provided by the disclosure provides a method of adaptive filtering for intra prediction, including that: an index is received, and filter selection is performed according to the index to generate a filter index corresponding to the index; a filter is selected corresponding to the filter index; and the filter is used to perform filtering operation on an input sample to generate a filtered sample, and the filtered sample is output, or the input sample is directly output as the filtered sample.

In one of the plurality of implementation examples of the above method of adaptive filtering for intra prediction, when the index indicates that the intra prediction operation is performed by using an image sample of a multiple reference line (MRL), the filter index indicates that the input sample is directly output as the filtered sample.

In one of the plurality of implementation examples provided by the disclosure, the image sample of the MRL includes image samples of a CT or a plurality of RTs, or a combination of the image samples.

In one of the plurality of implementation examples provided by the disclosure, the filter index selects the filter corresponding to the filter index to perform reference smoothing filtering (RSF). When the index indicates that the intra prediction operation is performed by using the image samples of the neighboring RTs, the RSF operation is performed on the input sample to output the filtered sample. When the index indicates that the intra prediction operation is performed by using the image samples of the MRL, the filter index indicates that the input sample is directly output as the filtered sample.

In one of the plurality of implementation examples provided by the disclosure, the filter index further selects the filter corresponding to the filter index to perform boundary filtering. When the index indicates that the intra prediction operation is performed by using the image samples of the neighboring RTs, the boundary filtering operation is performed on the input sample to output the filtered sample. When the index indicates that the intra prediction operation is performed by using the image samples of the MRL, the filter index indicates that the input sample is directly output as the filtered sample.

Although the disclosure has been disclosed as above with the embodiments, but the embodiments are not intended to limit the disclosure. Any one of ordinary skill in the art can make some changes and refinements without departing from the spirit and scope of the disclosure. Therefore, the protection scope of the disclosure shall be defined by the scope of the appended claims.

What is claimed is:

1. A method of adaptive filtering for intra prediction, comprising:
   receiving an index, and performing filter selection according to the index to generate a filter index corresponding to the index; and
   selecting a filter corresponding to the filter index, wherein when the index indicates that the intra prediction operation is performed by using image samples of a neighboring reference tier (RT), after the filtering operation is performed, the filter index indicates that the input sample by using the filter, the filtered sample is output; and
   when the index indicates that the intra prediction operation is performed by using image samples of a multiple reference line (MRL), the filter index indicates that the input ample is directly output as the filtered sample.

2. The method according to claim 1, wherein when the index indicates that the intra prediction operation is performed by using image samples of the multiple reference line (MRL), the filter index indicates that the input sample is directly output as the filtered sample.

3. The method according to claim 2, wherein the image samples of the MRL comprises image samples with a Composed Tier (CT) or a plurality of the reference tiers (RTs) or a combination thereof.

4. The method according to claim 1, wherein in the step of selecting the filter corresponding to the filter index to perform Reference Smoothing Filtering (RSF), wherein when the index indicates that the intra prediction operation is performed by using image samples of the neighboring reference tier (RT), after the RSF operation is performed on the input sample, the filtered sample is output; and when the index indicates that the intra prediction operation is performed by using image samples of the multiple reference line (MRL), the filter index indicates that the input sample is directly output as the filtered sample.

5. The method according to claim 4, further comprising selecting the filter corresponding to the filter index to perform boundary filtering, wherein when the index indicates that the intra prediction operation is performed by using the image samples of the neighboring RT, after the boundary filtering operation is performed on the input sample, the filtered sample is output; and when the index indicates that the intra prediction operation is performed by using the image samples of the MRL, the filter index indicates that the input sample is directly output as the filtered sample.

6. The method according to claim 1, further selecting the filter corresponding to the filter index to perform boundary filtering, wherein when the index indicates that the intra prediction operation is performed by using image samples of the neighboring reference tier (RT), after the boundary filtering operation is performed on the input sample, the filtered sample is output; and when the index indicates that the intra prediction operation is performed by using image samples of the multiple reference line (MRL), the filter index indicates that the input sample is directly output as the filtered sample.

7. A method of intra prediction with adaptive filtering, comprising:

receiving an input sample;

performing reference smoothing filtering (RSF) operation on the input sample according to an index, wherein when the index indicates that an image sample of a neighboring reference tier is used, after the RSF operation is performed on the input sample, the input sample is output as a filtered sample; and when the index indicates that in case of use of image samples of a multiple reference line (MRL), the input sample is directly output as the filtered sample; and performing intra prediction on the filtered sample.

8. The method according to claim 7, wherein the image samples of the MRL comprises image samples of a composed tier (CT) or a plurality of the reference tiers (RTs).

9. The method according to claim 7, further comprising:

performing the intra prediction on the filtered sample, and then outputting a plurality of predictors to perform boundary filtering, wherein when the index indicates that the intra prediction operation is performed by using the image samples of the neighboring RT, after the boundary filtering operation is performed on the predictors, the predictors are output; and when the index indicates that the intra prediction operation is performed by using the image samples of the MRL, the boundary filtering operation directly outputs the input sample as the filtered sample.

10. A video encoding apparatus, comprising:
a memory, configured to store a plurality of instructions and data; and a processor, accessing the instructions and the data and configured to execute the instructions, wherein the processor receives an index, and performs filter selection according to the index to generate a filter index corresponding to the index; and the processor selects a filter corresponding to the filter index, filters an input sample by using the filter to generate a filtered sample and outputs the filtered sample, or directly outputs the input sample as the filtered sample, when the index indicates that the intra prediction operation is performed by using image samples of a neighboring reference tier (RT), after the filtering operation is performed by the processor, the filter index indicates that the input sample by using the filter, the filtered sample is output; and when the index indicates that the intra prediction operation is performed by using image samples of a multiple reference line (MRL), the processor directly outputs the input sample as the filtered sample according to the filter index.

11. The video encoding apparatus according to claim 10, wherein the image sample of the MRL comprises image samples of a composed tier (CT) or a plurality of the reference tiers (RTs).

12. The video encoding apparatus according to claim 10, wherein the processor selects the filter corresponding to the filter index according to the filter index to perform reference smoothing filtering (RSF);

when the index indicates that the intra prediction operation is performed by using image samples of the neighboring reference tier (RT), the processor performs the RSF operation on the input sample and then outputs the filtered sample; and when the index indicates that the intra prediction operation is performed by using the image samples of the MRL, the processor directly outputs the input sample as the filtered sample according to the filter index.

13. The video encoding apparatus according to claim 12, wherein the processor further selects the filter corresponding to the filter index to perform boundary filtering;

when the index indicates that the intra prediction operation is performed by using the image samples of the neighboring RT, the processor performs the boundary filtering operation on the input sample and outputs the filtered sample; and when the index indicates that the intra prediction operation is performed by using the image samples of the MRL, the processor directly outputs the input sample as the filtered sample according to the filter index.

14. The video encoding apparatus according to claim 10), wherein the processor selects the filter corresponding to the filter index according to the filter index to perform boundary filtering; when the index indicates that the intra prediction operation is performed by using image samples of a neighboring reference tier (RI'), the processor performs the boundary filtering operation on the input sample and outputs the filtered sample; and when the index indicates that the intra prediction operation is performed by using the image samples of the MRI, the processor directly outputs the input sample as the filtered sample according to the filter index.

15. A video encoding apparatus, comprising:
an adder, configured to receive input image data and a predictor, and generate a residue after calculation;

a transformation and quantification unit, configured to transform the residue and then perform quantification to obtain data;

an entropy encoding unit, configured to process the data into compressed image data and output the compressed image data;

an inverse quantification and inverse transformation unit, configured to restore the data to video decoded image data; and a prediction unit, configured to receive the input image data and the video decoded image data and generate the predictor accordingly, wherein the prediction unit comprises an intra prediction unit; and the intra prediction unit is configured to receive an index, perform filter selection according to the index to generate a filter index corresponding to the index, and select a filter corresponding to the filter index for filtering operation, or directly output an input sample as a filtered sample, wherein when the index indicates that the intra prediction operation is performed by using image samples of a neighboring reference tier (RT), after the filtering operation is performed, the filter index indicates that the input sample by using the filter, the filtered sample is output; and when the index indicates that the intra prediction operation is performed by using image samples of a multiple reference line (MRL), the filter index indicates that the input sample is directly output as the filtered sample.

16. The video encoding apparatus according to claim 15, wherein the intra prediction unit selects the filter corresponding to the filter index according to the filter index to perform reference smoothing filtering (RSF), wherein when the index indicates that the intra prediction operation is performed by using image samples of the neighboring reference tier (RT), the intra prediction unit performs the RSF operation on the input sample and then outputs the filtered sample; and when the index indicates that the intra prediction operation is performed by using image samples of the MRL, the intra prediction unit directly outputs the input sample as the filtered sample according to the filter index.

17. The video encoding apparatus according to claim 15, wherein the intra prediction unit is configured to select the filter corresponding to the filter index to perform boundary filtering;

when the index indicates that the intra prediction operation is performed by using image samples of the neighboring reference tier (RT), the intra prediction unit performs the boundary filtering operation on the input sample and outputs the filtered sample; and when the index indicates that the intra prediction operation is performed by using image samples of the multiple reference line (MRL), the intra prediction unit directly outputs the input sample as the filtered sample according to the filter index.

18. A video decoding apparatus, comprising:

a memory, configured to temporarily store compressed image data;

an entropy decoding unit, configured to perform entropy decoding on the compressed image data according to an entropy encoding syntax element to obtain a bit stream;

a prediction processing unit, coupled to the entropy decoding unit;

an inverse quantification unit, coupled to the entropy decoding unit;

an inverse transformation processing unit, coupled to the inverse quantification unit;

a reconstruction unit, coupled to the inverse transformation processing unit and the prediction processing unit; and a filter unit, coupled to the reconstruction unit and the prediction processing unit, wherein the prediction processing unit, the inverse quantification unit, the inverse transformation processing unit, the reconstruction unit and the filter unit generate decoded video data based on a syntax element extracted from the bit stream; the prediction processing unit is configured to obtain an index, and determine whether reference smoothing filtering (RSF) operation and/or boundary filtering operation are/is performed on the decoded video data via the index wherein when the index indicates that the intra prediction operation is performed by using image samples of a neighboring reference tier (RT), after the RSF and/or the boundary filtering operation is performed, the filter index indicates that the input sample by using the filter, the filtered sample is output; and when the index indicates that the intra prediction operation is performed by using image samples of a multiple reference line (MRL), the filter index indicates that the input sample is directly output as the filtered sample.

* * * * *